US012726770B2

(12) United States Patent
Sun et al.

(10) Patent No.: US 12,726,770 B2
(45) Date of Patent: Sep. 1, 2026

(54) SPEAKER MODULE AND ELECTRONIC DEVICE

(71) Applicant: Honor Device Co., Ltd., Shenzhen (CN)

(72) Inventors: Dengcheng Sun, Shenzhen (CN); Jinhua Liu, Shenzhen (CN); Yunhai Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 126 days.

(21) Appl. No.: 18/839,184

(22) PCT Filed: Apr. 26, 2023

(86) PCT No.: PCT/CN2023/090796

§ 371 (c)(1),
(2) Date: Aug. 16, 2024

(87) PCT Pub. No.: WO2024/045660

PCT Pub. Date: Mar. 7, 2024

(65) Prior Publication Data

US 2025/0240576 A1 Jul. 24, 2025

(30) Foreign Application Priority Data

Aug. 31, 2022 (CN) ......................... 202211053374.0

(51) Int. Cl.
*H04R 9/02* (2006.01)
*H04R 1/02* (2006.01)
(Continued)

(52) U.S. Cl.
CPC ............. *H04R 9/025* (2013.01); *H04R 1/028* (2013.01); *H04R 7/04* (2013.01); *H04R 9/045* (2013.01);
(Continued)

(58) Field of Classification Search
CPC ...................................................... H04R 9/025
See application file for complete search history.

(56) References Cited

U.S. PATENT DOCUMENTS 10,631,096 B1 * 4/2020 Garcia Selva ....... H04R 1/2873
2008/0317255 A1 12/2008 Cozens et al.
(Continued)

FOREIGN PATENT DOCUMENTS

CN 1568070 A 1/2005
CN 204616082 U 9/2015
(Continued)

*Primary Examiner* — Matthew A Eason
(74) *Attorney, Agent, or Firm* — Leydig, Voit & Mayer, Ltd.

(57) ABSTRACT

This application provides a speaker module and an electronic device. The speaker module includes a first speaker and a second speaker. The first speaker includes a first magnetic circuit assembly, a first voice coil, and a first diaphragm assembly. The first magnetic circuit assembly includes a first magnetically conductive yoke and a first magnet. The first voice coil is disposed around the first magnet and connected to the first diaphragm assembly. The second speaker is stacked with the first speaker in a reverse direction. The second speaker includes a second magnetic circuit assembly, a second voice coil, and a second diaphragm assembly. The second magnetic circuit assembly includes a second magnetically conductive yoke and a second magnet. The second voice coil is disposed around the second magnet and connected to the second diaphragm assembly. The magnetic circuit poles of the first and second magnets are in the same direction.

20 Claims, 7 Drawing Sheets

(51) Int. Cl.
*H04R 7/04* (2006.01)
*H04R 9/04* (2006.01)
*H04R 9/06* (2006.01)

(52) U.S. Cl.
CPC .......... *H04R 9/063* (2013.01); *H04R 2400/11* (2013.01); *H04R 2499/15* (2013.01)

(56) References Cited

U.S. PATENT DOCUMENTS

| | | | | |
|---|---|---|---|---|
| 2011/0123061 | A1 | 5/2011 | Kamimura et al. | |
| 2011/0311093 | A1 | 12/2011 | He | |
| 2018/0020303 | A1* | 1/2018 | Shi | H04R 9/06 |
| 2022/0417648 | A1 | 12/2022 | Yang et al. | |

FOREIGN PATENT DOCUMENTS

| | | | |
|---|---|---|---|
| CN | 208112935 | U | 11/2018 |
| CN | 212519411 | U | 2/2021 |
| CN | 114501245 | A | 5/2022 |
| CN | 114501259 | A | 5/2022 |
| CN | 114653569 | A | 6/2022 |
| EP | 4044621 | A1 | 8/2022 |
| KR | 101503821 | B1 | 3/2015 |
| WO | 2006089995 | A1 | 8/2006 |
| WO | 2019205657 | A1 | 10/2019 |
| WO | 2021037259 | A1 | 3/2021 |

* cited by examiner

SPEAKER MODULE AND ELECTRONIC DEVICE

CROSS-REFERENCE TO RELATED APPLICATIONS

This application is a national stage of International Application No. PCT/CN2023/090796, filed on Apr. 26, 2023, which claims priority to Chinese Patent Application No. 202211053374.0, filed on Aug. 31, 2022. The disclosures of both of the aforementioned applications are hereby incorporated by reference in their entireties.

TECHNICAL FIELD

This application relates to the field of speakers, and in particular to a speaker module and an electronic device.

BACKGROUND

Demands on bass of electronic devices such as computers and mobile phones are getting higher. To satisfy a low-frequency response, an amplitude of a speaker is designed to be increasingly large. In this case, vibration of a voice coil and a diaphragm of the speaker stimulates a keyboard to vibrate. This affects use experience, and even produces obvious noise by resonance with the whole structure. Existence of this vibration limits enhancement of the bass. To reduce an output of a vibration force of the speaker and improve a bass capability, two same speakers are usually connected in a back-to-back manner to form a speaker module. Because vibration directions of the two same speakers are opposite to each other, the speaker module implements counteraction on vibration. However, due to interaction of magnets in the two speakers, when the speakers are not assembled as a whole, efficiency of magnetic circuits of the speakers is reduced. As a result, sound effect is affected.

SUMMARY

This application provides a speaker module and an electronic device, to resolve a problem that reduction of efficiency of a magnetic circuit of an existing speaker module affects sound effect.

To achieve the foregoing objective, the following technical solutions are used in this application.

According to a first aspect, a speaker module is provided. The speaker module includes a first speaker and a second speaker. The first speaker includes a first magnetic circuit assembly, a first voice coil, and a first diaphragm assembly. The first magnetic circuit assembly includes a first magnetically conductive yoke and a first magnet. The first diaphragm assembly and the first magnetically conductive yoke are enclosed to form first accommodation space. The first magnet and the first voice coil are located in the first accommodation space. The first voice coil is disposed around the first magnet and connected to the first diaphragm assembly. The second speaker is stacked with the first speaker in a reverse direction. The second speaker includes a second magnetic circuit assembly, a second voice coil, and a second diaphragm assembly. The second magnetic circuit assembly includes a second magnetically conductive yoke and a second magnet. The second diaphragm assembly and the second magnetically conductive yoke are enclosed to form second accommodation space. The second magnet and the second voice coil are located in the second accommodation space. The second voice coil is disposed around the second magnet and connected to the second diaphragm assembly. A direction of a magnetic pole of a magnetic circuit of the first magnet is consistent with a direction of a magnetic pole of a magnetic circuit of the second magnet. In this way, the first speaker and the second speaker of the speaker module jointly form a magnetic flow loop, and a magnetic field of the first magnet is superimposed with a magnetic field of the second magnet. Therefore, magnetic field strength of the first speaker and magnetic field strength of the second speaker are increased in comparison that the first speaker and the second speaker are used alone, and magnetic flux density of the speaker module is increased in a first magnetic gap and a second magnetic gap. In comparison that a direction of a magnetic pole of a magnetic circuit of a first magnet is opposite to a direction of a magnetic pole of a magnetic circuit of a second magnet of an existing speaker module, in this application, driving strength of the speaker module for the first diaphragm assembly and the second diaphragm assembly is larger, so that efficiency of utilizing the magnetic circuit of the speaker module is improved, and under same power, the speaker module has a strong driving force and better performance.

In an embodiment of the first aspect, the first speaker further includes a first center magnetic yoke. The first center magnetic yoke and the first magnetically conductive yoke jointly hold the first magnet. The first center magnetic yoke is used to constrain a magnetic line emitting from a first top surface of the first magnet, to enable the magnetic line to emit from an edge of the first center magnetic yoke. This increases magnetic flux density on the first voice coil. The second speaker further includes a second center magnetic yoke. The second center magnetic yoke and the second magnetically conductive yoke jointly hold the second magnet. The second center magnetic yoke is used to constrain a magnetic line emitting from a second top surface of the second magnet, to enable the magnetic line to emit from an edge of the second center magnetic yoke. This increases magnetic flux density on the second voice coil.

In an embodiment of the first aspect, the first speaker further includes a first support frame. The first support frame is connected between the first diaphragm assembly and the first magnetically conductive yoke. In this embodiment, due to the first speaker, a distance between the first diaphragm assembly and the first magnetic gap is increased. This provides large space for disposing the first voice coil. The first voice coil may use a long coil panel, to increase an induced magnetic field of the coil, and increase an amplitude of the first diaphragm assembly. The second speaker further includes a second support frame. The second support frame is connected between the second diaphragm assembly and the second magnetically conductive yoke. In this embodiment, due to the second speaker, a distance between the second diaphragm assembly and the second magnetic gap is increased. This provides large space for disposing the second voice coil. The second voice coil may use a long coil panel, to increase an induced magnetic field of the coil, and increase an amplitude of the second diaphragm assembly.

In an embodiment of the first aspect, the first magnetically conductive yoke, the first magnetic circuit assembly, the first voice coil, the first diaphragm assembly, the second magnetically conductive yoke, the second magnetic circuit assembly, the second voice coil, and the second diaphragm assembly are disposed in a same centerline, to enable magnetic field strength of the first voice coil and magnetic field strength of the second voice coil to be large.

In an embodiment of the first aspect, the first magnetically conductive yoke includes a first support portion and a first edge portion that is connected to the first support portion. The first edge portion and the first support portion are disposed at an included angle. The first edge portion is disposed around the first magnet. The first magnet is connected to the first support portion. A first magnetic gap is formed between the first magnet and the first edge portion. The first voice coil at least partially extends into the first magnetic gap. The second magnetically conductive yoke includes a second support portion and a second edge portion that is connected to the second support portion. The second edge portion and the second support portion are disposed at an included angle. The second edge portion is disposed around the second magnet. The second magnet is connected to the second support portion. A second magnetic gap is formed between the second magnet and the second edge portion. The second voice coil at least partially extends into the second magnetic gap. The first support portion and the second support portion are used to constrain a magnetic line between the first magnet and the second magnet. The first edge portion and the second edge portion are used to constrain a magnetic line in the first magnetic gap and the second magnetic gap, to enable a magnetic circuit to pass through the first edge portion and the second edge portion in sequence. This reduces losses of the magnetic field.

In an embodiment of the first aspect, a width of the first magnetic gap is the same as a width of the second magnetic gap, to enable a driving force applied on the first voice coil to be the same as a driving force applied on the second voice coil.

In an embodiment of the first aspect, the first magnet has four first side surfaces. The four first side surfaces are disposed around the first magnet. The first edge portion includes four first sub-portions. The four first sub-portions are disposed around the first magnet and are spaced apart from each other. Each first sub-portion is in parallel to one of the first side surfaces. A first magnetic gap is formed between the first sub-portion and the corresponding first side surface. In this case, the first sub-portion may be formed by bending an edge of a cross-shaped flat plate, to facilitate processing. In addition, due to the first sub-portions that are spaced apart from each other, density of magnetic lines of the first sub-portions is increased, to increase magnetic flux density in a partial region of the first voice coil. The second magnet has four first side surfaces. The four first side surfaces are disposed around the second magnet. The second edge portion includes four second sub-portions. The four second sub-portions are disposed around the second magnet and are spaced apart from each other. Each second sub-portion is in parallel to two of the first side surfaces. A second magnetic gap is formed between the second sub-portion and the corresponding first side surface. In this case, the second sub-portion may be formed by bending an edge of a cross-shaped flat plate, to facilitate processing. In addition, due to the second sub-portions that are spaced apart from each other, density of magnetic lines of the second sub-portions is increased, to increase magnetic flux density in a partial region of the second voice coil.

In an embodiment of the first aspect, the first magnetic circuit assembly further includes a first edge-magnetic structure. The first edge-magnetic structure is disposed in the first accommodation space and disposed around the first magnet. A direction of a magnetic pole of a magnetic circuit of the first edge-magnetic structure is opposite to the direction of the magnetic pole of the magnetic circuit of the first magnet. A first magnetic gap is formed between the first edge-magnetic structure and the first magnet. The second magnetic circuit assembly further includes a second edge-magnetic structure. The second edge-magnetic structure is disposed in the second accommodation space and disposed around the second magnet. A direction of a magnetic pole of a magnetic circuit of the second edge-magnetic structure is opposite to the direction of the magnetic pole of the magnetic circuit of the second magnet. A second magnetic gap is formed between the second edge-magnetic structure and the second magnet. The direction of the magnetic pole of the magnetic circuit of the first edge-magnetic structure is opposite to the direction of the magnetic pole of the magnetic circuit of the second edge-magnetic structure. The first edge-magnetic structure and the second edge-magnetic structure are capable of providing an external magnetic field to the speaker module, to enhance magnetic field strength in a magnetic circuit formed by the speaker module. This further improves the driving forces for vibration of the first diaphragm assembly and the second diaphragm assembly.

In an embodiment of the first aspect, the first edge-magnetic structure includes a plurality of first edge magnets. All the plurality of first edge magnets are disposed in the first accommodation space and circumferentially disposed around the first magnet. The second edge-magnetic structure includes a plurality of second edge magnets. All the plurality of second edge magnets are disposed in the second accommodation space and circumferentially disposed around the second magnet. Due to the plurality of first edge magnets and the plurality of second edge magnets, processing on the first edge-magnetic structure and the second edge-magnetic structure is implemented, and selection on a quantity is flexible.

In an embodiment of the first aspect, the first speaker is spaced apart from the second speaker, and the first speaker does not need to be connected to the second speaker, to avoid resulting in reliability problems such as dropping, assembling, and colliding. This reduces requirements for mounting precision of the first speaker and the second speaker, so that assembling difficulty is reduced, and the speaker module is rapidly assembled. In addition, costs of new processes are avoided.

In an embodiment of the first aspect, the first speaker abuts against the second speaker, to reduce the distance between the first magnet and the second magnet, and increase superimposition effect of the magnetic field between the first magnet and the second magnet.

In an embodiment of the first aspect, the speaker module further includes a third magnet that is disposed between the first speaker and the second speaker. A direction of a magnetic pole of a magnetic circuit of the third magnet is consistent with the direction of the magnetic pole of the magnetic circuit of the first magnet and the direction of the magnetic pole of the magnetic circuit of the second magnet. The third magnet provides an external magnetic field for the first speaker and the second speaker, and a magnetic line of the third magnet is superimposed with magnetic circuits in the first speaker and the second speaker. Compared to an embodiment without the third magnet, in this embodiment, the speaker module enhances the magnetic flux density in the first magnetic gap and the second magnetic gap. Therefore, the driving forces for the first voice coil and the second voice coil are increased, and an amplitude of the first diaphragm assembly and an amplitude of the second diaphragm assembly are increased.

In an embodiment of the first aspect, the third magnet is connected to at least one of the first speaker and the second speaker. For example, the third magnet is connected to the first speaker but spaced apart from the second speaker, and alternatively, the third magnet is connected to the second speaker but spaced apart from the first speaker. In this way, the first speaker does not need to be connected to the second speaker, but only the third magnet needs to be disposed on the first speaker or the second speaker, to avoid resulting in the reliability problems, and reduce the assembling difficulty. The third magnet may also be connected to both the first speaker and the second speaker, to reduce the distance between the first magnet and the second magnet, and enhance the magnetic field strength of the speaker module.

In an embodiment of the first aspect, a first avoidance slot is provided on a side, facing the second magnetically conductive yoke, of the first magnetically conductive yoke, and the third magnet is at least partially accommodated in the first avoidance slot, to reduce the distance between the first magnet and the second magnet.

In an embodiment of the first aspect, the first avoidance slot is a through-slot, and the third magnet is connected to the first magnet, to enable the magnetic line of the third magnet to be directly connected to the magnetic line of the first magnet, and further reduce the distance between the first magnet and the second magnet.

In an embodiment of the first aspect, a second avoidance slot is provided on a side, facing the first magnetically conductive yoke of the second magnetically conductive yoke, and the third magnet is at least partially accommodated in the second avoidance slot, to reduce the distance between the first magnet and the second magnet.

In an embodiment of the first aspect, the second avoidance slot is a through-slot, and the third magnet is connected to the second magnet, to enable the magnetic line of the third magnet to be directly connected to the magnetic line of the second magnet, and further reduce the distance between the first magnet and the second magnet.

According to a second aspect, an electronic device is provided. The electronic device includes the speaker module in the foregoing embodiments. By disposing of the speaker module on the electronic device, noise on the keyboard is reduced, and sound effect of the electronic device is improved.

In an embodiment of the second aspect, the electronic device is a laptop computer. The laptop computer includes a housing, a middle plate, and a keyboard. The middle plate is disposed in the housing, the keyboard and the speaker module are fastened to the middle plate, and a first speaker and a second speaker respectively output voices to a front surface and a back surface of the middle plate, and drive a first diaphragm assembly and a second diaphragm assembly to synchronously vibrate in opposite directions. Therefore, the first speaker and the second speaker counteract at least partial opposite acting forces, to reduce to some extent vibration against a center frame, and reduce noise on the keyboard.

DESCRIPTION OF EMBODIMENTS

Figure 1:
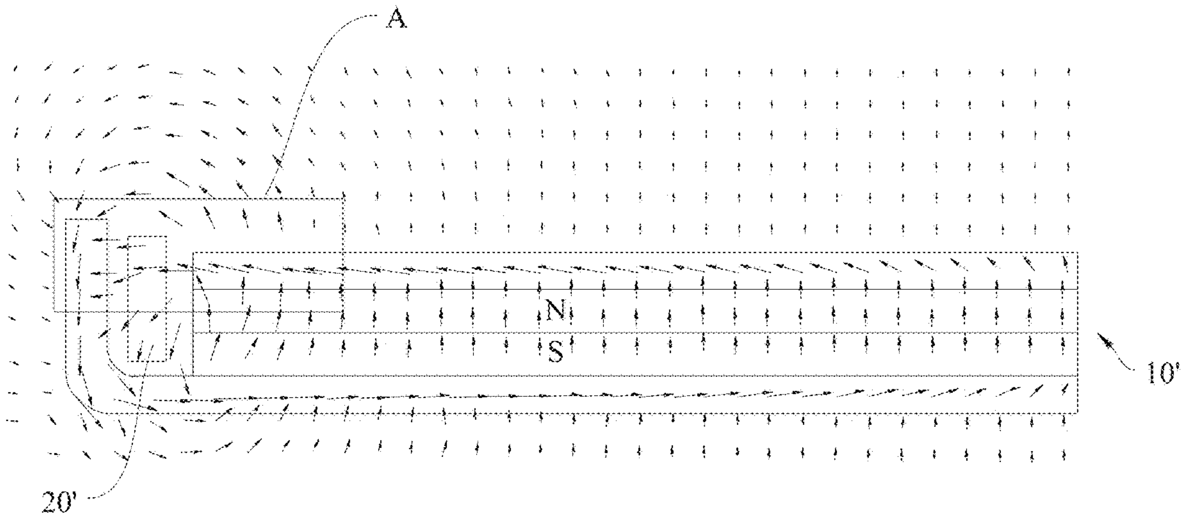
FIG. 1 is a simulation diagram of a magnetic circuit of a current speaker when being used alone.

The embodiments of this application are described below in detail. The embodiments are shown in the drawings. The same or similar numerals represent the same or similar elements or elements having the same or similar functions throughout the specification. The embodiments described below with reference to the accompanying drawings are exemplary, and are only used to explain this application but should not be construed as a limitation to this application.

In the description of this application, it should be understood that an orientation or a position relationship indicated by the terms "inside" and "outside", or the like is an orientation or position relationship shown in the accompanying drawings, and is merely intended to facilitate description and simplify description of this application, but is not intended to indicate or imply that a specified apparatus or element must have a specific orientation, be constructed in a specific orientation, and operate in a specific orientation. Therefore, this application cannot be construed as a limitation.

To clearly describe the technical solutions in embodiments of this application, terms such as "first" and "second" are used in embodiments of this application to distinguish between same items or similar items that provide basically same functions or purposes. For example, a first limiting portion and a second limiting portion are merely intended to distinguish between different is limited, but not to limit a sequential order thereof. It may be understood that the words "first", "second", and the like are not intended to limit the number and execution sequence, and the words "first", "second", and the like are also unnecessarily different.

It should be noted that, in this application, a word such as "in an embodiment" or "for example" is used to represent giving an example, an illustration, or a description. Any embodiment or design scheme described as the word "in an embodiment" or "for example" in this application should not be explained as being more preferred or having more advantages than another embodiment or design scheme. Exactly, use of the word "in an embodiment" or "for example" is intended to present a related concept in a specific manner.

In this application, unless otherwise clearly specified, the terms such as "interconnection" and "connection" are intended to be understood in a broad sense. For example, the "connection" may be a fixed connection, removable connection, or integral connection; may be a mechanical connection or electrical connection: may be a direct connection or indirect connection via a medium: and may be a communication or interaction between two elements. Those of ordinary skill in the art may understand specific meanings of the foregoing terms in this application based on a specific situation.

To make the objectives, technical solutions, and advantages of this application clearer, this application is further described in detail below with reference to the accompanying drawings and embodiments.

Figure 2:
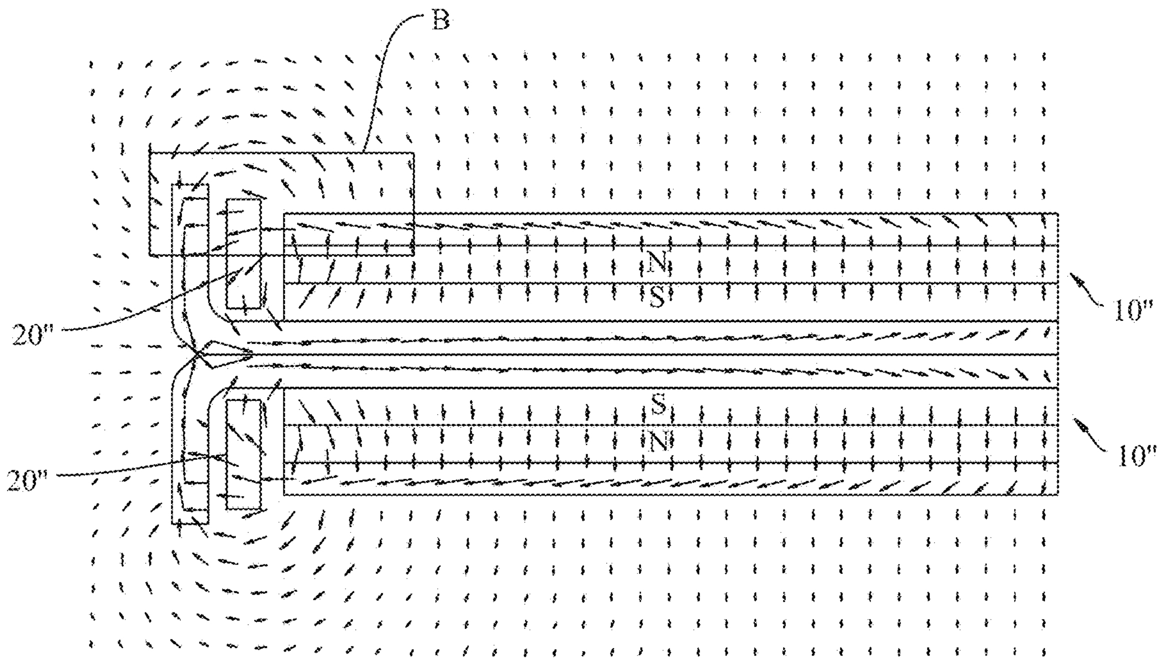
FIG. 2 is a simulation diagram of a magnetic circuit of a current speaker module.

With development of speaker technologies, there is a growing demand on bass in electronic devices such as computers and mobile phones. To satisfy a low frequency response, an amplitude of a speaker is designed to be increasingly large. An existing speaker includes a diaphragm assembly, a voice coil 20' that is fastened to the diaphragm assembly, a magnetic circuit assembly 10' that is disposed on a side of the voice coil 20' on the diaphragm assembly, and a bracket that is configured to connect the diaphragm assembly and the magnetic circuit assembly 10'. The magnetic circuit assembly 10' may form a magnetic circuit (as shown in FIG. 1), and the voice coil 20' generates an induced magnetic field after being energized, and is displaced under magnetic action of the magnetic circuit assembly 10'. The displacement of the voice coil 20' may drive the diaphragm assembly to vibrate, to promote air to vibrate, and form a sound wave. Therefore, the speaker can output voice. A speaker on a laptop computer is used as an example. The speaker is mounted on a middle plate that is disposed in a housing body on a keyboard side of the laptop computer. When the speaker operates, variation of the diaphragm assembly stimulates, through the middle plate, the keyboard to vibrate, resulting in resonance of keys on the keyboard. When the keys resonate, the keys are prone to collide with another structure on the housing body in which the keys are located. As a result, noise is generated. The noise affects sound play back effect of the speaker, and limits enhancement of a bass. To reduce an output of a vibration force of the speaker and improve a bass capability, two same finished speakers are usually directly mounted in a back-to-back manner on the middle plate, to form a speaker module. When the speaker module operates, because orientations of diaphragm assemblies on the two finished speakers are opposite to each other, vibration directions of the diaphragm assemblies on the two finished speakers are also opposite to each other. This counteracts vibration of the two speakers, reduces vibration to the keyboard, and reduces the noise. However, because directions of magnetic poles of magnetic circuits of two magnets in the speaker module are opposite to each other, the speaker module forms two symmetrical magnetic line loops. Magnetic fields of two magnetic circuit assemblies 10" interact with each other, resulting in counteraction of partial magnetic lines. When the finished speakers are used alone (for example, a region A in FIG. 1), magnetic flux (for example, a region B in FIG. 2) of each finished speaker on the voice coil 20" is reduced. As a result, when the finished speakers are not assembled as a whole, efficiency of magnetic circuits of the finished speakers is reduced, and sound effect is affected.

To resolve the above problem, this application provides a speaker module 100 and an electronic device. Compared with a current speaker module 100 formed by directly docking two same speakers in a reverse direction, the speaker module 100 improves magnetic flux density in a magnetic gap, that is, improves magnetic field strength on the voice coil, and improves efficiency of utilizing the magnetic circuit. The electronic device is an electronic device with the speaker module 100. A current speaker used alone is replaced with the speaker module 100 in this application, to reduce noise generated due to vibration.

Specifically, the electronic device includes, but is not limited to, electronic devices such as a mobile phone, a tablet personal computer, a laptop computer, a personal digital assistant (PDA), a personal computer, a notebook computer, an in-vehicle device, and a wearable device. In the following embodiments, the electronic device is a laptop computer.

The electronic device includes a display and a keyboard host. The display is configured to display an image, a video, and the like. The keyboard host is rotatably connected to the display. The keyboard host is configured to: input instructions and data, and control, based on input instructions and data, the display to display the image and the video. In addition, the keyboard host is further configured to play back voice or music. In this embodiment, the key board host includes a housing, a middle plate 90, a keyboard, and the speaker module 100.

Figure 3:
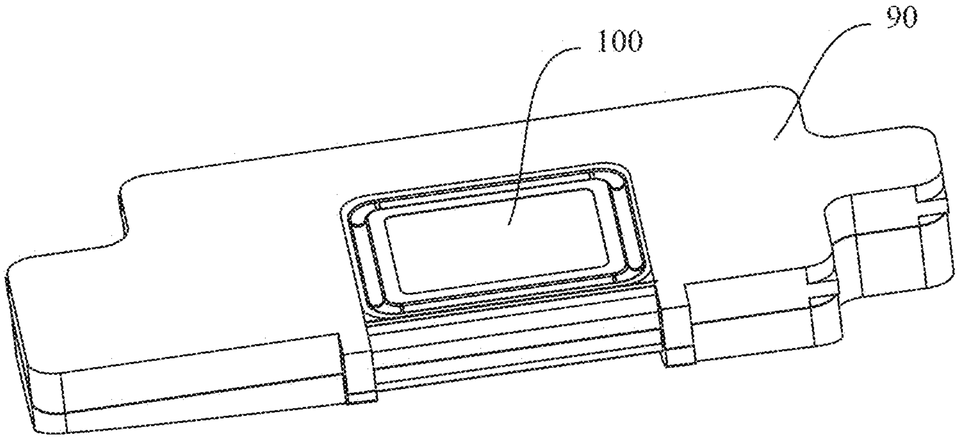
FIG. 3 is a three-dimensional diagram of assembling of a speaker module with a middle plate according to an embodiment of this application.

The housing is configured to protect an internal structure of the keyboard host. The middle plate 90 is located in internal accommodation space of the housing, and used as a support "skeleton" for electronic components in the keyboard host. Refer to FIG. 3. The key board and the speaker module 100 are directly or indirectly fastened to the middle plate 90. The keyboard is configured to input the instructions and data. The speaker module 100 is configured to convert an audio electrical signal into a sound signal. The keyboard host plays back the voice and music through the speaker module 100.

Figure 4:
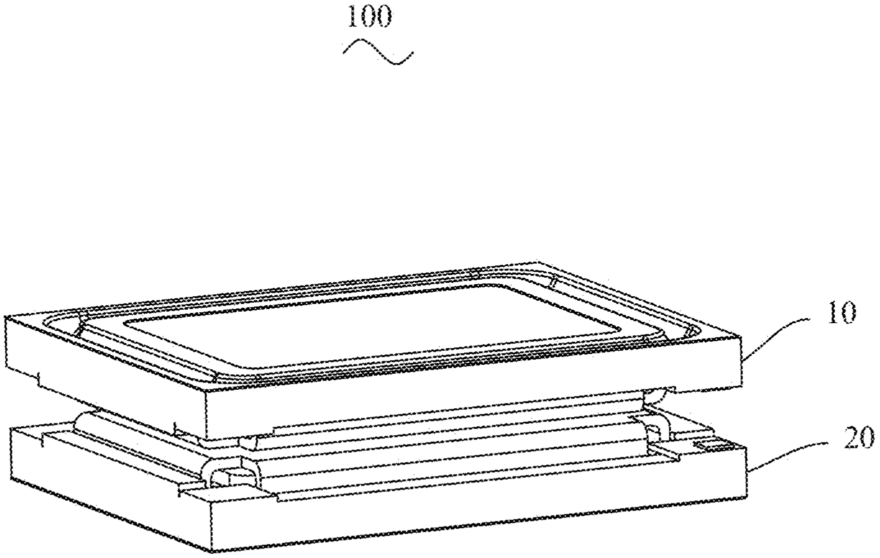
FIG. 4 is a three-dimensional diagram of a structure of a speaker module according to an embodiment of this application.

Refer to FIG. 4. There may be two speaker modules 100. The two speaker modules 100 are disposed at two ends of the keyboard host in a width direction. The two speaker modules 100 have a same structure and are symmetrically disposed relative to a keyboard housing. In other embodiments, there may be one or more than three speaker modules 100. This is not specifically limited herein. It should be noted that a position of the speaker module 100 in the key board host is flexible, and is not specifically limited herein.

Figure 5:
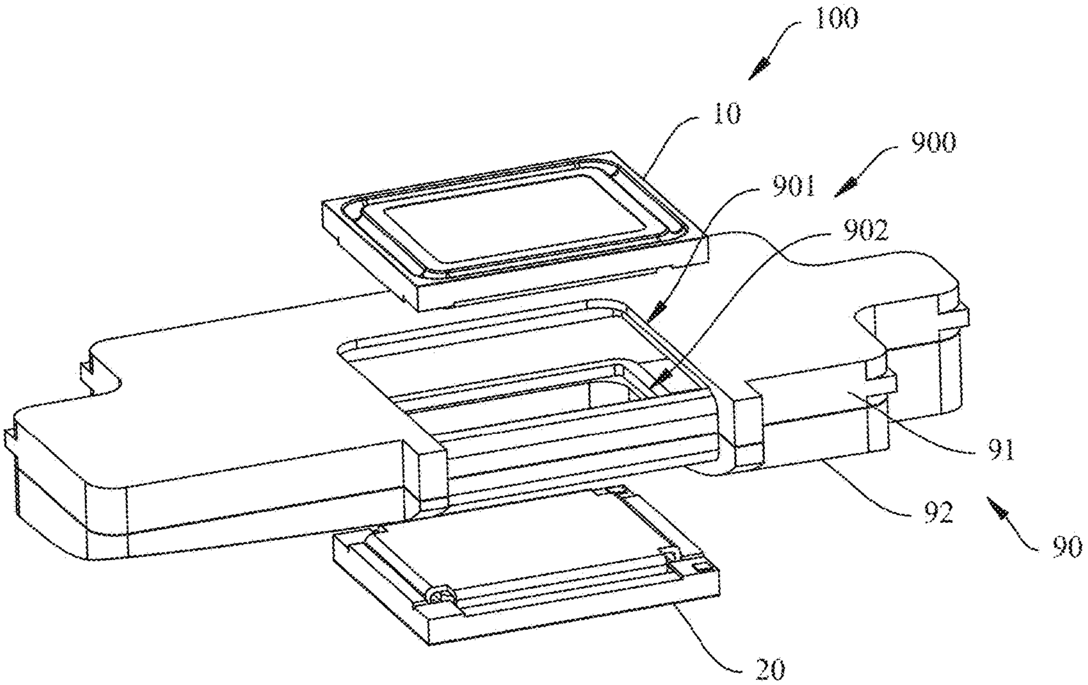
FIG. 5 is a partial exploded view of the speaker module and the middle plate in FIG. 3.

Refer to FIG. 4. The speaker module 100 includes a first speaker 10 and a second speaker 20. The middle plate 90 may be provided with a mounting hole 900. Both the first speaker 10 and the second speaker 20 are disposed in the mounting hole 900, and orientations of the first speaker 10 and the second speaker 20 are opposite to each other. Refer to FIG. 5. For example, the middle plate 90 includes a first plate portion 91 and a second plate portion 92. The middle plate 90 is provided with a mounting hole 900 that penetrates through the first plate portion 91 and the second plate portion 92. The mounting hole 900 includes a first hole section 901 that is located in the first plate portion 91 and a second hole section 902 that is located in the second plate portion 92. The first speaker 10 is mounted in the first hole section 901, and the second speaker 20 is mounted in the second hole section 902. The first plate portion 91 and the second plate portion 92 may be spaced apart from each other.

Figure 6:
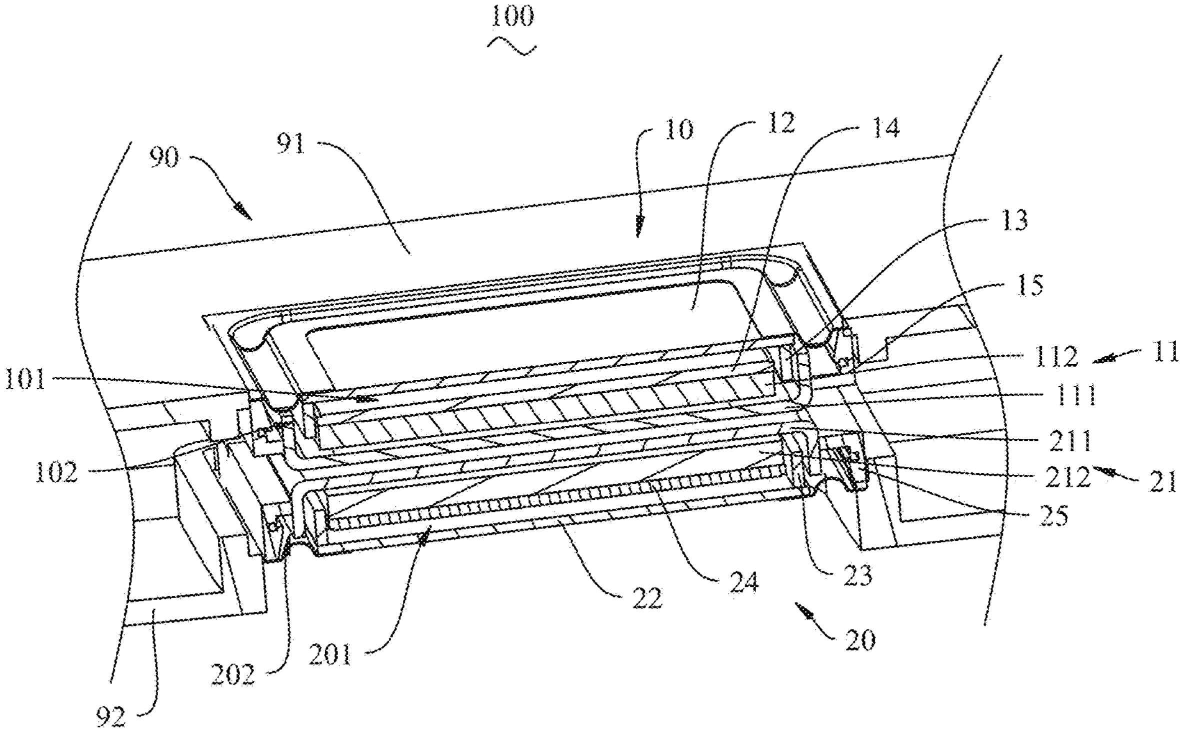
FIG. 6 is a sectional view of the speaker module in FIG. 4.
Figure 7:
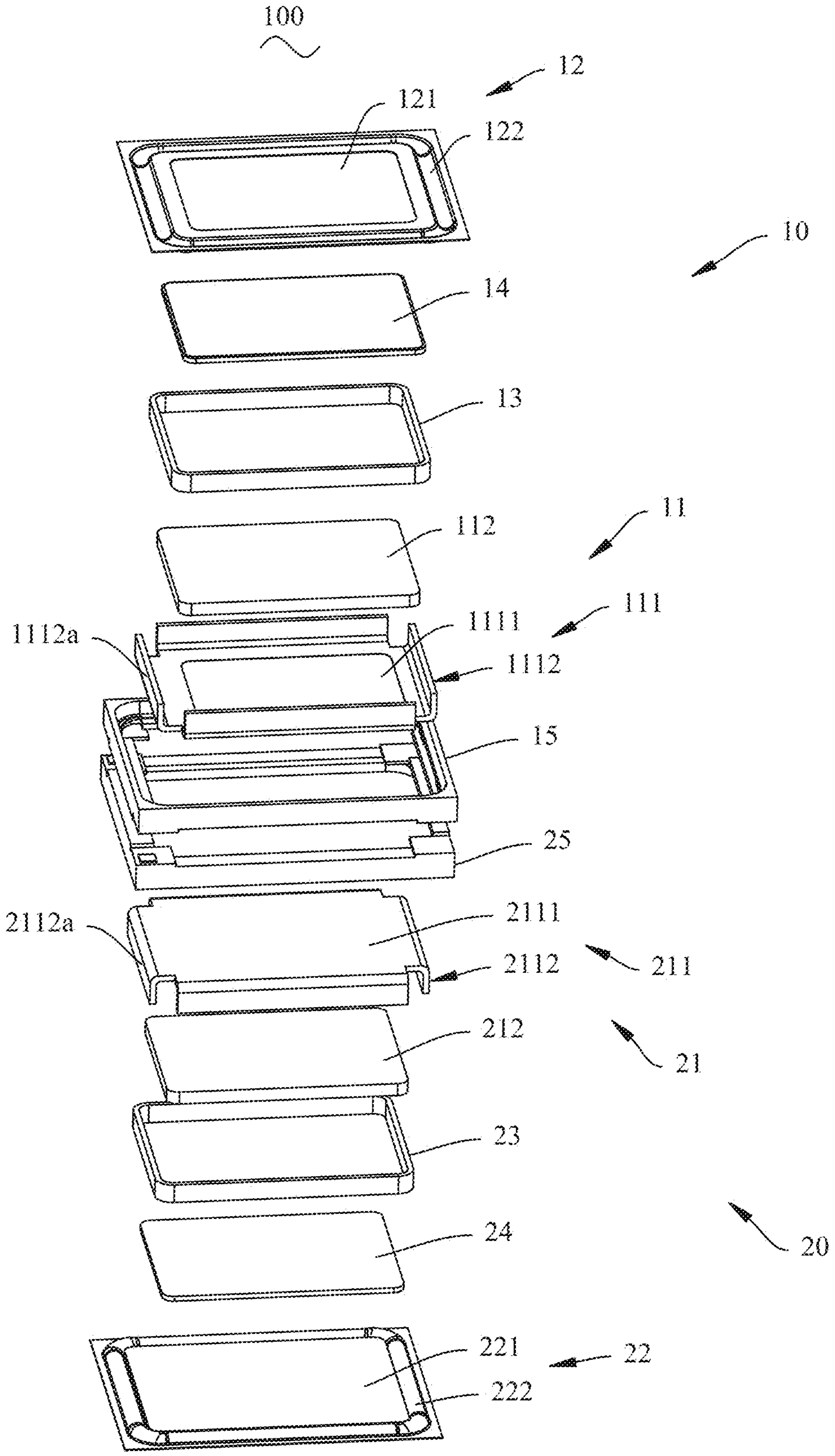
FIG. 7 is an exploded view of the speaker module in FIG. 4.

Refer to FIG. 6 and FIG. 7. The first speaker 10 includes a first magnetic circuit assembly 11, a first voice coil 13, and a first diaphragm assembly 12. The first magnetic circuit assembly 11 includes a first magnetically conductive yoke 111 and a first magnet 112. The first diaphragm assembly 12 is connected to the first magnetically conductive yoke 111 and the first diaphragm assembly 12 and the first magnetically conductive yoke 111 are enclosed to form first accommodation space 101. The first magnet 112 is located in the first accommodation space 101 and may be connected to the first magnetically conductive yoke 111. The first voice coil 13 is located in the first accommodation space 101 and connected to the first diaphragm assembly 12.

The first magnet 112 has two magnetic poles with different magnetism. One magnetic pole of the first magnet 112 is close to the first diaphragm assembly 12, and the other magnetic pole is away from the first diaphragm assembly 12. The two magnetic poles of the first magnet 112 are respectively an N pole and an S pole. In this embodiment, the N pole of the first magnet 112 is close to the first diaphragm assembly 12, and the S pole of the first magnet 112 is away from the first diaphragm assembly 12. The first magnet 112 emits a magnetic field around the first magnet 112. A magnetic line of an external magnetic field of the first magnet 112 emits from the N pole of the first magnet 112, enters the S pole, and passes through a voice coil. A magnetic line of an internal magnetic field of the first magnet 112 extends from the S pole to the N pole. The internal and external magnetic lines of the first magnet 112 jointly form a magnetic circuit. The first magnet 112 may be a permanent magnet, for example, a ferrite magnet, an aluminum-nickel-cobalt magnet, or a neodymium-iron-boron magnet, or may be an apparatus that may generate a magnetic field, for example, an electromagnet.

The first magnetically conductive yoke 111 may be formed as a slot-shaped structure, and the first magnet 112 is disposed in the slot-shaped structure. The first magnet 112 is spaced apart from a groove wall of the slot-shaped structure, to form a first magnetic gap 102 between the first magnet 112 and the groove wall of the slot-shaped structure. The first voice coil 13 may be a coil panel that is formed by winding a wire. An end, away from the first diaphragm assembly 12, of the first voice coil 13 may extend into the first magnetic gap 102. The first magnetically conductive yoke 111 is enclosed at a periphery of the first magnet 112, to gather the magnetic lines emitted by the first magnet 112 into the first magnetically conductive yoke 111, and enable more magnetic lines to pass through the first voice coil 13. The first voice coil 13 generates an induced magnetic field after being energized. In this case, the first voice coil 13 may be displaced under magnetic action of the first magnet 112, and drive the first diaphragm assembly 12 to vibrate. The vibration of the first diaphragm assembly 12 promotes air to vibrate, to generate a sound wave. The first magnetically conductive yoke 111 may be integrally formed by processing a metal material capable of being attracted by a magnet, for example, iron, nickel, or cobalt, or may be integrally formed by processing a metal alloy containing iron, nickel, or cobalt.

The first diaphragm assembly 12 includes a first diaphragm sheet 121 and a first dome ring 122. The first dome ring 122 is disposed around an edge of the first diaphragm sheet 121, and the first dome ring 122 is connected to the first magnetically conductive yoke 111. The first dome ring 122 has a flat portion. The flat portion is connected to a side, facing the first accommodation space 101, of the first diaphragm sheet 121. The first voice coil 13 is connected to a side, away from the first diaphragm sheet 121, of the flat portion in a manner of adhering or the like.

As shown in FIG. 6 and FIG. 7, the second speaker 20 includes a second magnetic circuit assembly 21, a second voice coil 23, and a second diaphragm assembly 22. The second magnetic circuit assembly 21 includes a second magnetically conductive yoke 211 and a second magnet 212. The second diaphragm assembly 22 is connected to the second magnetically conductive yoke 211 and the second diaphragm assembly 22 and the second magnetically conductive yoke 211 are enclosed to form second accommodation space 201. The second magnet 212 is located in the second accommodation space 201 and may be connected to the second magnetically conductive yoke 211. The second voice coil 23 is located in the second accommodation space 201 and connected to the second diaphragm assembly 22.

The second magnet 212 has two magnetic poles with different magnetism. One magnetic pole of the second magnet 212 is close to the second diaphragm assembly 22, and the other magnetic pole is away from the second diaphragm assembly 22. The two magnetic poles of the second magnet 212 are respectively an N pole and an S pole. In this embodiment, the N pole of the second magnet 212 is away from the second diaphragm assembly 22, and the S pole of the second magnet 212 is close to the second diaphragm assembly 22. The second magnet 212 emits a magnetic field around the second magnet 212. A magnetic line of an external magnetic field of the second magnet 212 emits from the N pole of the second magnet 212, enters the S pole, and passes through a voice coil. A magnetic line of an internal magnetic field of the second magnet 212 extends from the S pole to the N pole. Internal and external magnetic lines of the second magnet 212 jointly form a magnetic circuit. The second magnet 212 may be a permanent magnet, for example, a ferrite magnet, an aluminum-nickel-cobalt magnet, or a neodymium-iron-boron magnet, or may be an apparatus that may generate a magnetic field, for example, an electromagnet.

The second magnetically conductive yoke 211 may be formed as a slot-shaped structure, and the second magnet 212 is disposed in the slot-shaped structure. The second magnet 212 is spaced apart from a groove wall of the slot-shaped structure, to form a second magnetic gap 202 between the second magnet 212 and the groove wall of the slot-shaped structure. The second voice coil 23 may be a coil panel that is formed by winding a wire. Two ends, away from the second diaphragm assembly 22, of the second voice coil 23 may extend into the second magnetic gap 202. The second magnetically conductive yoke 211 is enclosed at a periphery of the second magnet 212, to gather the magnetic lines emitted by the second magnet 212 into the second magnetically conductive yoke 211, and enable more magnetic lines to pass through the second voice coil 23. The second voice coil 23 generates an induced magnetic field after being energized. In this case, the second voice coil 23 may be displaced under magnetic action of the second magnet 212, and drive the second diaphragm assembly 22 to vibrate. The vibration of the second diaphragm assembly 22 promotes air to vibrate, to generate a sound wave. The second magnetically conductive yoke 211 may be integrally formed by processing a metal material capable of being attracted by a magnet, for example, iron, nickel, or cobalt, or may be integrally formed by processing a metal alloy containing iron, nickel, or cobalt.

The second diaphragm assembly 22 includes a second diaphragm sheet 221 and a second dome ring 222. The second dome ring 222 is disposed around an edge of the second diaphragm sheet 221, and the second dome ring 222 is connected to the second magnetically conductive yoke 211. The second dome ring 222 has a flat portion. The flat portion is connected to a side, facing the second accommodation space 201, of the second diaphragm sheet 221. The second voice coil 23 is connected to a side, away from the second diaphragm sheet 221, of the flat portion in a manner of adhering or the like.

In the speaker module 100, the first speaker 10 is stacked with the second speaker 20 in a reverse direction. In other words, the first magnetically conductive yoke 111 and the second magnetically conductive yoke 211 are close to each other, the first diaphragm assembly 12 and the second diaphragm assembly 22 are away from each other, and an orientation of the first diaphragm assembly 12 is opposite to an orientation of the second diaphragm assembly 22. In this case, the first speaker 10 and the second speaker 20 output voices in opposite directions.

In the speaker module 100, a direction of a magnetic pole of a magnetic circuit of the first magnet 112 is consistent with a direction of a magnetic pole of a magnetic circuit of the second magnet 212. In other words, in the speaker module 100, same magnetic poles of the first magnet 112 and the second magnet 212 face a same direction. In this way, the first speaker 10 and the second speaker 20 of the speaker module 100 jointly form a magnetic flow loop together, and a magnetic field of the first magnet 112 is superimposed with a magnetic field of the second magnet 212. Therefore, magnetic field strength of the first speaker 10 and magnetic field strength of the second speaker 20 are increased in comparison that the first speaker 10 and the second speaker 20 are used alone, and magnetic flux density of the speaker module 100 is increased in a first magnetic gap 102 and a second magnetic gap 202. In comparison that the direction of the magnetic pole of the magnetic circuit of the first magnet 112 is opposite to the direction of the magnetic pole of the magnetic circuit of the second magnet 212 of a current speaker module 100, in this application, driving strength of the speaker module 100 for the first diaphragm assembly 12 and the second diaphragm assembly 22 is larger, so that efficiency of utilizing the magnetic circuit of the speaker module 100 is improved, and under same power, the speaker module 100 has a strong driving force and better performance.

It should be noted that, the direction of the magnetic pole of the magnetic circuit means a direction from the N pole to the S pole inside the magnet. In this embodiment, both the directions of the magnetic poles of the magnetic circuits of the first magnet 112 and the second magnet 212 in the speaker module 100 are a direction from the first diaphragm assembly 12 to the second diaphragm assembly 22. In this case, the first magnet 112 and the second magnet 212 of the speaker module 100 form a magnetic circuit. A path of the magnetic circuit is the S pole in the first magnet 112—the N pole in the first magnet 112—the first magnetic gap 102—a side wall of the first magnetically conductive yoke 111—a side wall of the second magnetically conductive yoke 211—the second magnetic gap 202—the S pole in the second magnet 212—the N pole in the second magnet 212—a bottom wall of the second magnetically conductive yoke 211—a bottom wall of the first magnetically conductive yoke 111—the S pole in the first magnet 112. In other embodiments, both the directions of the magnetic poles of the magnetic circuits of the first magnet 112 and the second magnet 212 may also be a direction from the second diaphragm assembly 22 to the first diaphragm assembly 12. In this case, a path of the magnetic circuit of the speaker module 100 is opposite to the path of the magnetic circuit in this embodiment. Details are not described herein.

During use, currents whose directions are opposite may be applied to the first voice coil 13 and the second voice coil 23. Directions of magnetic forces generated by the first voice coil 13 and the second voice coil 23 through electromagnetic induction are the same, and a direction of a magnetic flow in the first magnetic gap 102 is opposite to a direction of a magnetic flow in the second magnetic gap 202. Therefore, the first voice coil 13 and the second voice coil 23 are capable of synchronously moving in reverse directions, and drive the first diaphragm assembly 12 and the second diaphragm assembly 22 to synchronously vibrate in reverse directions. Therefore, the first speaker 10 and the second speaker 20 counteract at least partial reverse acting forces, to reduce to some extent vibration against a center frame, and reduce noise on the key board.

The first speaker 10 and the second speaker 20 may be two finished speakers that have a same structure and may operate alone. Directions of magnetic poles of magnetic circuits of magnets in the two finished speakers are set to be opposite to each other. During manufacturing, the two finished speakers may be directly mounted in reverse directions, to enable mounting directions of the two finished speakers to be the same as mounting directions of the first speaker 10 and the second speaker 20 in the speaker module 100 in the foregoing embodiments, and form the speaker module 100 in this application. In this case, because the first speaker 10 and the second speaker 20 of the speaker module 100 are mounted in the opposite directions, the directions of the magnetic poles of the magnetic circuits of the first magnet 112 and the second magnet 212 are the same, to form a relatively stronger magnetic flow loop. The two finished speakers may be quickly assembled to form the speaker module 100 in this application, so that costs are saved, flexibility of assembling is strong, positions and models of the first speaker 10 and the second speaker 20 can be adjusted as required, and steps of adjusting and improving a structure of each speaker are reduced when the integrated speaker module 100 is manufactured.

A current speaker usually has a center magnet and an edge magnet. The edge magnet is circumferentially enclosed at the center magnet, to constrain a magnetic line. A magnetic gap is formed between the center magnet and the edge magnet. When the speaker is assembled, the center magnet and the edge magnet need to be positioned separately, which is time-consuming and laborious. In addition, if the two speakers of this type are assembled in the opposite directions to form the speaker module, the directions of the magnetic poles of the magnetic circuits of the center magnet and the edge magnet need to be set correspondingly. Furthermore, because the edge magnet may constrain the magnetic lines, generate the magnetic lines, and guide the directions of the magnetic lines, positions of the edge magnets of the two speakers need to be aligned. If an alignment error of the edge magnets of the two speakers is large, directions and strength of the magnetic circuits are affected. In addition, when the two speakers are docked in the opposite directions, directions of magnetic lines between the two center magnets are easy to be changed under magnetic influence of the edge magnets. As a result, overall magnetic field strength of the speaker module is affected.

In the speaker module 100, the speaker module 100 constrains the magnetic lines through the first magnetically conductive yoke 111 and the second magnetically conductive yoke 211, to enable the magnetic lines in the magnetic circuit in the speaker module 100 to be converged in the first magnetically conductive yoke 111 and the second magnetically conductive yoke 211, and increase magnetic flux density in the first magnetic gap 102 and the second magnetic gap 202. In comparison with the manner of disposing the edge magnet for constraining, costs for disposing the first magnetically conductive yoke 111 and the second magnetically conductive yoke 211 are lower, a structure is simpler, and a step of setting the direction of the magnetic pole of the magnetic circuit of the edge magnet is reduced, and effect of an error of positions of the first speaker 10 and the second speaker 20 on the magnetic field is reduced. Therefore, the speaker module 100 can be assembled more rapidly and conveniently. The first speaker 10 is used as an example. As shown in FIG. 6, the first magnetic gap 102 is formed by enclosing the side wall of the first magnetically conductive yoke 111 and the first magnet 112. During assembling, only a mounting position of the first magnet 112 needs to be determined, without considering a position of the edge magnet. In addition, a width of the first magnetic gap 102 in a circumferential direction of the first magnet 112 is fixed, to facilitate rapid assembling of the first speaker 10. The first magnetically conductive yoke 111 is enclosed at the first magnet 112 in a circumferential direction, to protect the first magnet 112 without separately disposing a protective housing body. Therefore, costs are saved. For the second speaker 20, the second magnetically conductive yoke 211 has same functions. Details are not described herein. It should be noted that the width of the first magnetic gap 102 means a distance between the first magnet 112 and the side wall of the first magnetically conductive yoke 111.

When the first speaker 10 and the second speaker 20 are assembled in opposite directions to form the speaker module 100, the magnetic field in the speaker module 100 is generated only by the first magnet 112 and the second magnet 212. Compared with a speaker module having an edge magnet, the speaker module 100 eliminates interference of the edge magnet. In addition, the first magnetically conductive yoke 111 and the second magnetically conductive yoke 211 in the speaker module 100 implement constraint on the magnetic lines, and isolate the first magnetic gap 102 and the second magnetic gap 202. This avoids influence of an air flow fluctuation between the first magnetic gap 102 and the second magnetic gap 202 on the first voice coil 13 and the second voice coil 23.

Specifically, as shown in FIG. 6 and FIG. 7, the first magnetically conductive yoke 111 includes a first support portion 1111 and a first edge portion 1112 that is connected to the first support portion 1111, and the first edge portion 1112 and the first support portion 1111 are disposed at an included angle, to enable the first support portion 1111 and the first edge portion 1112 to jointly form a slot-shaped structure. The first support portion 1111 forms a bottom wall of the slot-shaped structure, and the first edge portion 1112 forms a side wall of the slot-shaped structure. Both the first edge portion 1112 and the first support portion 1111 are in a plate shape, the first edge portion 1112 may be perpendicular to the first support portion 1111, the first magnet 112 is mounted to the first support portion 1111, the first edge portion 1112 is circumferentially enclosed at the first magnet 112, and the first edge portion 1112 is spaced from the first magnet 112 to form the first magnetic gap 102.

The second magnetically conductive yoke 211 includes a second support portion 2111 and a second edge portion 2112 that is connected to the second support portion 2111, and the second edge portion 2112 and the second support portion 2111 are disposed at an included angle, to enable the second support portion 2111 and the second edge portion 2112 to jointly form a slot-shaped structure. The second support portion 2111 forms a bottom wall of the slot-shaped structure, and the second edge portion 2112 forms a side wall of the slot-shaped structure. Both the second edge portion 2112 and the second support portion 2111 are in a plate shape, the second edge portion 2112 may be perpendicular to the second support portion 2111, the second magnet 212 is mounted to the second support portion 2111, the second edge portion 2112 is circumferentially enclosed at the second magnet 212, and the second edge portion 2112 is spaced from the second magnet 212 to form the second magnetic gap 202.

For example, as shown in FIG. 6 and FIG. 7, the first magnet 112 is a quadrilateral. The first magnet 112 has a first top surface, a first bottom surface, and a first side surface. The first top surface is opposite to the first bottom surface. There are four first side surfaces. The four first side surfaces have a same area, and are jointly disposed around the first top surface and the first bottom surface. An included angle between two adjacent first side surfaces is 90°. A cross-section of the first support portion 1111 is a square. As shown in FIG. 6, the first edge portion 1112 includes four first sub-portions 1112*a*. The four first sub-portions 1112*a* are disposed around an edge of the first support portion 1111, and are all perpendicular to the first support portion 1111. The first bottom surface is connected to the first support portion 1111, and each first sub-portion 1112*a* is in parallel to one first side surface of the first magnet 112. The first support portion 1111 is integrated with the first edge portion 1112. The first bottom surface of the first magnet 112 may be adhered to the first support portion 1111 with adhesive. Alternatively, the first magnet 112 may be fastened to the first support portion 1111 by machining bolt holes on the first magnet 112 and the first support portion 1111 and inserting bolts into the bolt holes on the first magnet 112 and the first support portion 1111.

The second magnet 212 is a quadrilateral. The second magnet 212 has a second top surface, a second bottom surface, and a first side surface. The second top surface is opposite to the second bottom surface. There are four first side surfaces. The four first side surfaces have a same area, and are jointly disposed around the second top surface and the second bottom surface. An included angle between two adjacent first side surfaces is 90°. A cross-section of the second support portion 2111 is a square. As shown in FIG. 7, the second edge portion 2112 includes four second sub-portions 2112*a*. The four second sub-portions 2112*a* are disposed around an edge of the second support portion 2111, and are all perpendicular to the second support portion 2111. The second bottom surface is connected to the second support portion 2111, and each second sub-portions 2112*a* is in parallel to one second side surface of the second magnet 212. The second support portion 2111 and the second edge portion 2112 are integrally formed. The second bottom surface of the second magnet 212 may be adhered to the second support portion 2111 with adhesive. Alternatively, the second magnet 212 may be fastened to the second support portion 2111 by machining bolt holes on the second magnet 212 and the second support portion 2111 and inserting bolts into the bolt holes on the second magnet 212 and the second support portion 2111.

In an embodiment, one first magnetic gap 102 is formed between each first sub-portion 1112*a* and a first side surface corresponding to the first sub-portion 1112*a*, and widths of first magnetic gaps 102 formed between four first sub-portions 1112*a* and first side surfaces corresponding to the four first sub-portions 1112*a* are equal, to enable driving forces applied on the first voice coil 13 to be uniform. Two second magnetic gaps 202 are formed between each second sub-portion 2112*a* and first side surfaces corresponding to the second sub-portion 2112*a*, and widths of second magnetic gaps 202 formed between four second sub-portions 2112*a* and first side surfaces corresponding to the four second sub-portions 2112*a* are equal, to enable driving forces applied on the second voice coil 23 to be uniform.

Optionally, the four first sub-portions 1112*a* are spaced apart from each other. In this case, the first sub-portions 1112*a* may be formed by bending an edge of a cross-shaped flat plate, to facilitate processing. In addition, due to the first sub-portions 1112*a* that are spaced apart from each other, density of magnetic lines of the first sub-portions 1112*a* is increased, to increase magnetic flux density in a partial region of the first voice coil 13. An area of a side wall of a slot-shaped structure formed by the first sub-portions 1112*a* is the same as an area of the first side surface of the first magnet 112, to enable the magnetic lines in the first magnetic gap 102 to be uniformly distributed.

The four second sub-portions 2112*a* are spaced apart from each other. In this case, the second sub-portions 2112*a* may be formed by bending an edge of a cross-shaped flat plate, to facilitate processing. In addition, due to the second sub-portions 2112*a* that are spaced apart from each other, density of magnetic lines converged in the second sub-portion 2112*a* is increased, to increase magnetic flux density on the second voice coil 23. An area of a side wall of a slot-shaped structure formed by the second sub-portions 2112*a* is the same as an area of a first side surface of the second magnet 212, to enable the magnetic lines in the second magnetic gap 202 to be uniformly distributed.

To improve the constraint on the magnetic lines, as shown in FIG. 6 and FIG. 7, the first magnetic circuit assembly 11 further includes a first center magnetic yoke 14. The first magnet 112 is held between the first magnetically conductive yoke 111 and the first center magnetic yoke 14, that is, the first center magnetic yoke 14 is connected to a first top surface of the first magnet 112. In this case, a magnetic gap is formed between the first center magnetic yoke 14 and the first edge portion 1112. The first center magnetic yoke 14 is used to constrain a magnetic line emitting from the first top surface of the first magnet 112, to enable the magnetic line to emit from an edge of the first center magnetic yoke 14. This increases magnetic flux density on the first voice coil 13. The first center magnetic yoke 14 may be fastened to the first magnet 112 in a manner of adhering or clamping, or in a manner of a threaded connection. The first center magnetic yoke 14 may be integrally formed by processing a metal material capable of being attracted by a magnet, for example, iron, nickel, or cobalt, or may be integrally formed by processing a metal alloy containing iron, nickel, or cobalt. The first diaphragm assembly 12 and the first center magnetic yoke 14 are spaced apart from each other, to avoid affecting vibration of the first diaphragm assembly 12. Optionally, a cross-section of the first center magnetic yoke 14 and a cross-section of the first magnetic body 112 are quadrilaterals in a same shape, and the edge of the first center magnetic yoke 14 is flush with the first side surface of the first magnet 112, to facilitate constraining all magnetic lines emitting from the first top surface of the first magnet 112.

The second magnetic circuit assembly 21 further includes a second center magnetic yoke 24. The second magnet 212 is held between the second magnetically conductive yoke 211 and the second center magnetic yoke 24, that is, the second center magnetic yoke 24 is connected to a second top surface of the second magnet 212. In this case, a magnetic gap is formed between the second center magnetic yoke 24 and the second edge portion 2112. The second center magnetic yoke 24 is used to constrain a magnetic line emitting from a second top surface of the second magnet 212, to enable the magnetic line to emit from an edge of the second center magnetic yoke 24. This increases the magnetic flux density on the second voice coil 23. The second center magnetic yoke 24 may be fastened to the second magnet 212 in a manner of adhering or clamping, or in a manner of a threaded connection. The second center magnetic yoke 24 may be integrally formed with a metal material capable of being attracted by a magnet, for example, iron, nickel, or cobalt, or may be integrally formed with two of a metal alloy containing iron, nickel, or cobalt. The second diaphragm assembly 22 and the second center magnetic yoke 24 are spaced apart from each other, to avoid affecting vibration of the second diaphragm assembly 22. Optionally, a cross-section of the second center magnetic yoke 24 and a cross-section of the second magnetic body 212 are quadrilaterals in a same shape, and an edge of the second center magnetic yoke 24 is flush with the first side surface of the second magnet 212, to facilitate constraining all magnetic lines emitting from the second top surface of the second magnet 212.

In other embodiments, the first magnetic circuit assembly 11 may further include a first magnetically conductive yoke 111, a first magnet 112, a first center magnetic yoke 14, and a first edge-magnetic structure. The first edge-magnetic structure is disposed in the first accommodation space and disposed around the first magnet 112. The first edge-magnetic structure is connected to the first magnetically conductive yoke 111. Specifically, the first edge-magnetic structure abuts against the first edge portion 1112. The first magnetic gap 102 is formed between the first edge-magnetic structure and the first magnet 112. The first edge-magnetic structure is magnetic, and a direction of a magnetic pole of a magnetic circuit of the first edge-magnetic structure is opposite to the direction of the magnetic pole of the magnetic circuit of the first magnet 112. In other words, when the N pole of the first magnet 112 is close to the first diaphragm assembly 12 and the S pole is away from the first diaphragm assembly 12, an S pole of the first edge-magnetic structure is close to the first diaphragm assembly 12 and an N pole of the first edge-magnetic structure is away from the first diaphragm assembly 12. The first edge-magnetic structure is capable of providing an external magnetic field, to enhance magnetic field strength in a magnetic circuit formed by the speaker module 100. This further improves the driving forces for vibration of the first diaphragm assembly 12.

Specifically, the first edge-magnetic structure includes a plurality of first edge magnets. The plurality of first edge magnets are disposed in the first accommodation space and circumferentially disposed around the first magnet 112. Due to the plurality of first edge magnets, processing on the first edge-magnetic structure is implemented, and selection on a quantity is flexible. All directions of magnetic poles of magnetic circuits of the plurality of first edge magnets are the same, and are opposite to the direction of the magnetic pole of the magnetic circuit of the first magnet 112. In other words, all S poles of the first edge magnets are close to the first diaphragm assembly 12, and all N poles of the first edge magnets are away from the first diaphragm assembly 12. The first edge magnets sequentially abut against each other end to end, to form a ring structure around the first magnet 112, and provide relatively large magnetic field strength. The first edge magnets may also be circumferentially arranged at an interval around the first magnet 112, to improve flexibility of mounting the first edge magnets. There may be two first edge magnets. The two first edge magnets are respectively disposed on opposite sides of the first magnet 112, and the first edge magnets are connected to corresponding first sub-portions 1112*a*. There may be four first edge magnets. The four first edge magnets are separately connected to the first sub-portion 1112*a*. In this case, the four first edge magnets are arranged at an equal interval.

The second magnetic circuit assembly 21 may further include a second magnetically conductive yoke 211, a second magnet 212, a second center magnetic yoke 24, and a second edge-magnetic structure. The second edge-magnetic structure is disposed in the second accommodation space and disposed around the second magnet 212. The second edge-magnetic structure is connected to the second magnetically conductive yoke 211. Specifically, the second edge-magnetic structure abuts against the second edge portion 2112. The second magnetic gap 202 is formed between the second edge-magnetic structure and the second magnet 212.

The second edge-magnetic structure is magnetic, and a direction of a magnetic pole of a magnetic circuit of the second edge-magnetic structure is opposite to the direction of the magnetic pole of the magnetic circuit of the second magnet 212. In other words, when the N pole of the second magnet 212 is close to the second diaphragm assembly 22 and the S pole is away from the second diaphragm assembly 22, an S pole of the second edge-magnetic structure is close to the second diaphragm assembly 22 and an N pole of the second edge-magnetic structure is away from the second diaphragm assembly 22. In this case, the direction of the magnetic pole of the magnetic circuit of the second edge-magnetic structure is opposite to the direction of the magnetic pole of the magnetic circuit of the first edge-magnetic structure. The second edge-magnetic structure is capable of providing an external magnetic field, to enhance magnetic field strength in a magnetic circuit formed by the speaker module 100. This further improves the driving forces for vibration of the second diaphragm assembly 22.

Specifically, the second edge-magnetic structure includes a plurality of second edge magnets. The plurality of second edge magnets are disposed in the second accommodation space and circumferentially disposed around the second magnet 212. Due to the plurality of second edge magnets, processing on the second edge-magnetic structure is implemented, and selection on a quantity is flexible. All directions of magnetic poles of magnetic circuits of the plurality of second edge magnets are the same, and are opposite to the direction of the magnetic pole of the magnetic circuit of the second magnet 212. In other words, all S poles of the second edge magnets are close to the second diaphragm assembly 22, and all N poles of the second edge magnets are away from the second diaphragm assembly 22. The second edge magnets abut against each other end to end, to form a ring structure around the second magnet 212, and provide relatively large magnetic field strength. The second edge magnets may also be circumferentially disposed arranged around the second magnet 212, to increase flexibility of mounting the second edge magnets. There may be two second edge magnets. The two second edge magnets are respectively disposed on opposite sides of the second magnet 212, and the second edge magnets are connected to corresponding second sub-portions 2112*a*. There may be four second edge magnets. The four second edge magnets are separately connected to the second sub-portion 2112*a*. In this case, the four second edge magnets are arranged in an equal interval.

The first magnetically conductive yoke 111 and the first diaphragm assembly 12 may be directly connected, or may be connected through another structure. For example, the first magnetically conductive yoke 111 and the first diaphragm assembly 12 may be directly connected through the middle plate 90. This is not limited herein. When the first magnetically conductive yoke 111 is directly connected to the first diaphragm assembly 12, the first magnetically conductive yoke 111 enables functions of supporting and connecting. Therefore, a step of disposing a housing is reduced. In comparison with a speaker having an edge magnet, due to a connection between the first magnetically conductive yoke 111 and the first diaphragm assembly 12, a structure of the speaker is simplified, a processing step is reduced, and a volume of the speaker is reduced, because the edge magnet may not be directly connected to the first diaphragm assembly 12.

The second magnetically conductive yoke 211 and the second diaphragm assembly 22 may be directly connected, or may be connected through another structure. For example, the second magnetically conductive yoke 211 and the second diaphragm assembly 22 may be directly connected through the middle plate 90. This is not limited herein. When the second magnetically conductive yoke 211 is directly connected to the second diaphragm assembly 22, the second magnetically conductive yoke 211 enables functions of supporting and connecting. Therefore, a step of disposing a housing is reduced. In comparison with a speaker having an edge magnet, due to a connection between the second magnetically conductive yoke 211 and the second diaphragm assembly 22, the structure of the speaker is simplified, a processing step is reduced, and a volume of the speaker is reduced, because the edge magnet may not be directly connected to the second diaphragm assembly 22.

In an embodiment, as shown in FIG. 6, the first speaker 10 further includes a first support frame 15. The first magnetically conductive yoke 111 is connected to the first diaphragm assembly 12 through the first support frame 15, and the first support frame 15 is disposed between the first magnetically conductive yoke 111 and the first diaphragm assembly 12. Compared with a speaker of which the first diaphragm assembly 12 is directly connected to the first magnetically conductive yoke 111, in this embodiment, due to the first speaker 10, a distance between the first diaphragm assembly 12 and the first magnetic gap 102 is increased. This provides large space for disposing the first voice coil 13. The first voice coil 13 may use a long coil panel, to increase an induced magnetic field of the coil, and increase an amplitude of the first diaphragm assembly 12. The first support frame 15 facilitates a connection between the first speaker 10 and another component. For a laptop computer, the first speaker 10 may be connected to the middle plate 90 through the first support frame 15. Specifically, the first speaker 10 may be mounted in a first hole section 901 through the first support frame 15.

The second speaker 20 further includes a second support frame 25. The second magnetically conductive yoke 211 is connected to the second diaphragm assembly 22 through the second support frame 25, and the second support frame 25 is disposed between the second magnetically conductive yoke 211 and the second diaphragm assembly 22. Compared with a speaker of which the second diaphragm assembly 22 is directly connected to the second magnetically conductive yoke 211, in this embodiment, due to the second speaker 20, a distance between the second diaphragm assembly 22 and the second magnetic gap 202 is increased. This provides large space for disposing the second voice coil 23. The second voice coil 23 may use a long coil panel, to increase an induced magnetic field of the coil, and increase an amplitude of the second diaphragm assembly 22. The second support frame 25 facilitates a connection between the second speaker 20 and another component. For a laptop computer, the second speaker 20 may be connected to the middle plate 90 through the second support frame 25. Specifically, the second speaker 20 may be mounted in a second hole section 902 through the second support frame 25.

The first support frame 15 and the second support frame 25 may be directly connected, to enable the first speaker 10 and the second speaker 20 to be connected as a whole. The first support frame 15 and the second support frame 25 may either not be directly connected, but may both be mounted on another component of a keyboard, for example, indirectly connected through the middle plate 90 (as in FIG. 3), to limit positions of the first speaker 10 and the second speaker 20. Specifically, the first support frame 15 is connected to the first plate portion 91, the second support frame 25 is connected to the second plate portion 92, and the first plate portion 91 is connected to the second plate portion 92, to form the middle plate 90.

In an embodiment, the first speaker 10 and the second speaker 20 have a same size and model, and are disposed in alignment. It may be understood that, the first diaphragm assembly 12, the first voice coil 13, the first magnetic circuit assembly 11, the second diaphragm assembly 22, the second voice coil 23, and the second diaphragm assembly 22 are disposed in a same centerline, to enable magnetic field strength at the first voice coil 13 and the second voice coil 23 to be large. In other embodiments, the first speaker 10 and the second speaker 20 may also not be completely disposed in alignment, not be completely disposed in parallel, or may be substantially disposed aligned and substantially in parallel, to reduce limitation on the mounting precision, and implement rapid mounting. In addition, the magnetic flux density in the first magnetic gap 102 is the same as the magnetic flux density in the second magnetic gap 202, to enable a vibration amplitude of the first diaphragm assembly 12 and a vibration amplitude of the second diaphragm assembly 22 to be similar, and reduce noise.

Figure 8:
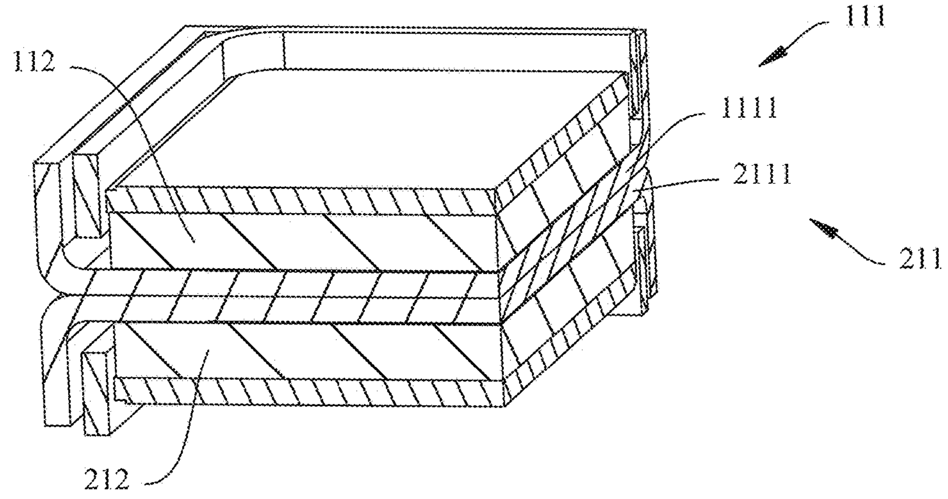
FIG. 8, FIG. 10, FIG. 11, FIG. 12, FIG. 13, FIG. 14, and FIG. 15 are partial sectional views of a speaker module in different embodiments.
Figure 9:
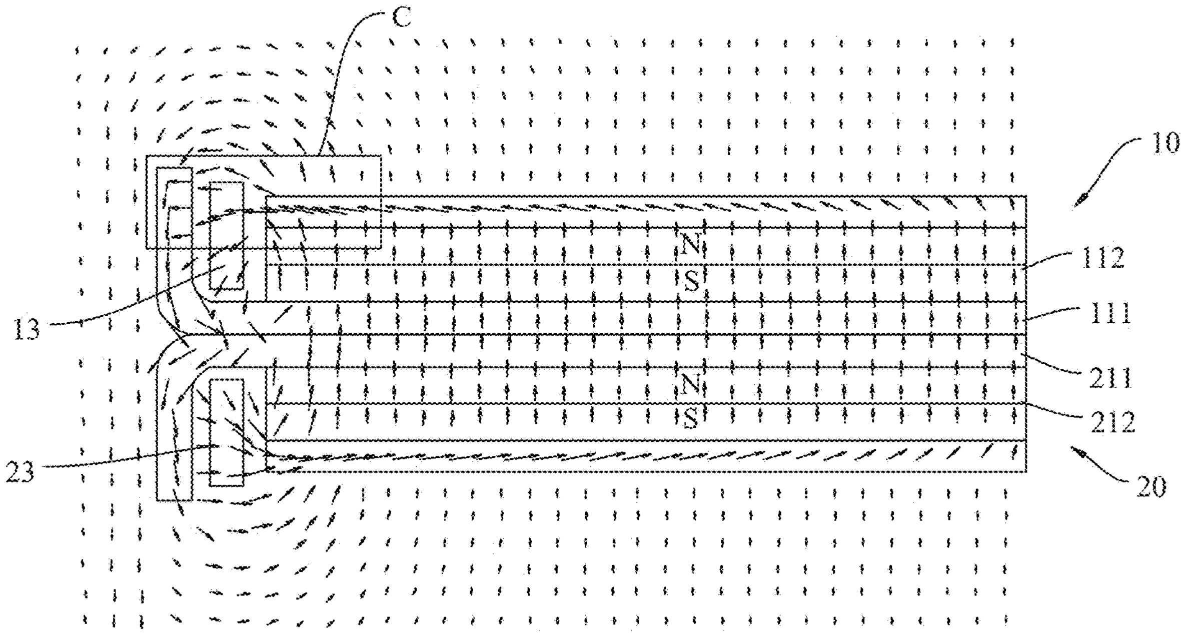
FIG. 9 is a simulation diagram of a magnetic circuit of the speaker module in FIG. 8.

Refer to FIG. 8 and FIG. 9. In an embodiment, the first speaker 10 abuts against the second speaker 20, that is, the first magnetically conductive yoke 111 abuts against the second magnetically conductive yoke 211, to reduce the distance between the first magnet 112 and the second magnet 212, and increase the superimposition effect of the magnetic field between the first magnet 112 and the second magnet 212 (for example, a region C in FIG. 9). In addition, the magnetic lines between the first magnet 112 and the second magnet 212 are constrained by the first magnetically conductive yoke 111 and the second magnetically conductive yoke 211 while being conducted, to reduce magnetic leakage. The first support portion 1111 may be fastened to the second support portion 2111 by adhering and soldering. Alternatively, the first support portion 1111 and the second support portion 2111 may be supported against each other without being fastened. This is not limited herein.

Figure 10:
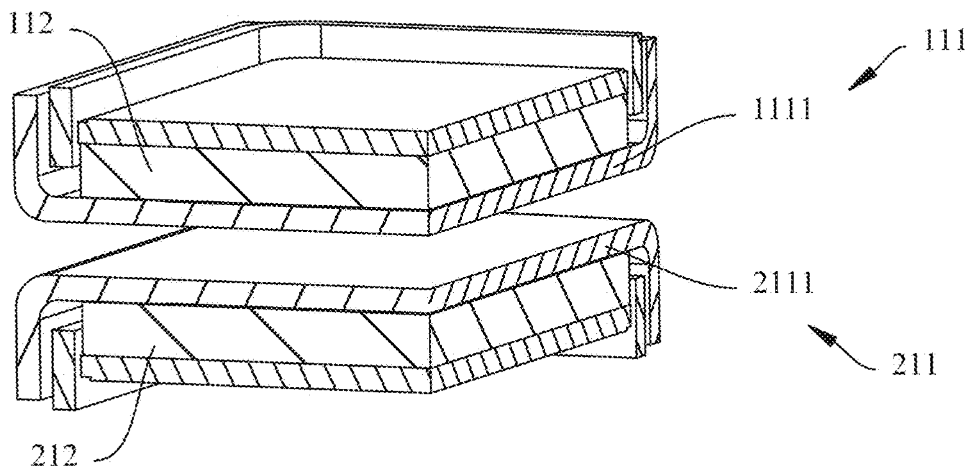

Refer to FIG. 10. In an embodiment, the first speaker 10 is spaced apart from the second speaker 20, that is, the first magnetically conductive yoke 111 and the second magnetically conductive yoke 211, and the first speaker 10 does not need to be connected to the second speaker 20, to avoid resulting in reliability problems such as dropping, assembling, and colliding. This reduces requirements for mounting precision of the first speaker 10 and the second speaker 20, so that assembling difficulty is reduced, and the speaker module 100 is rapidly assembled. In addition, costs of new processes are avoided. Because the distance between the first magnet 112 and the second magnet 212 is increased, and the magnetic line between the first magnet 112 and the second magnet 212 is lost in a gap between the first magnetically conductive yoke 111 and the second magnetically conductive yoke 211. Compared with an embodiment in which the first speaker 10 abuts against the second speaker 20, in this embodiment, the magnetic flux density on the first voice coil 13 and the second voice coil 23 is reduced. In practice, the distance between the first speaker 10 and the second speaker 20 may not be large, and may accommodate a mounting tolerance. For a speaker module 100 on the laptop computer, a distance between the first speaker 10 and the second speaker 20 may be controlled between 0.4 mm to 0.8 mm.

Figure 11:
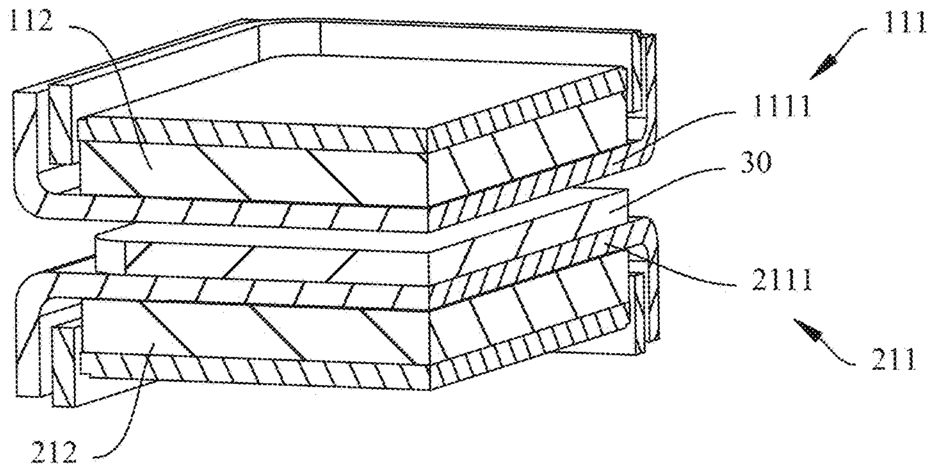
Figure 12:
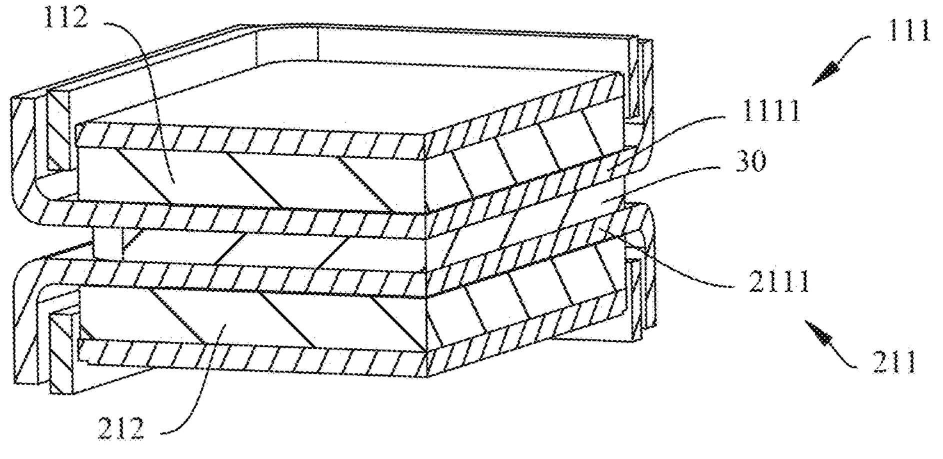

Refer to FIG. 11 and FIG. 12. In an embodiment, the speaker module 100 further includes a third magnet 30. The first speaker 10 is spaced apart from the second speaker 20, and the third magnet 30 is located between the first speaker 10 and the second speaker 20 and connected to at least one of the first speaker 10 and the second speaker 20. For example, the third magnet 30 is connected to the first speaker 10 but spaced apart from the second speaker 20, and alternatively, the third magnet 30 is connected to the second speaker 20 but spaced apart from the first speaker 10. In this way, the first speaker 10 does not need to be connected to the second speaker 20, but only the third magnet 30 needs to be disposed on the first speaker 10 or the second speaker 20, to avoid resulting in the reliability problems, and reduce the assembling difficulty. The third magnet 30 may also be connected to both the first speaker 10 and the second speaker 20, to reduce the distance between the first magnet 112 and the second magnet 212, and enhance the magnetic field strength of the speaker module 100. In the speaker module 100, the direction of the magnetic pole of the magnetic circuit of the third magnet 30 is the same as the direction of the magnetic pole of the magnetic circuit of the first magnet 112 and the direction of the magnetic pole of the magnetic circuit of the second magnet 212, that is, orientations of same magnetic poles of the first magnet 112, the second magnet 212, and the third magnet 30 are the same. The third magnet 30 provides an external magnetic field for the first speaker 10 and the second speaker 20, and a magnetic line of the third magnet 30 is superimposed with magnetic circuits in the first speaker 10 and the second speaker 20. Compared to an embodiment without the third magnet 30, in this embodiment, the speaker module 100 enhances the magnetic flux density in the first magnetic gap 102 and the second magnetic gap 202. Therefore, the driving forces for the first voice coil 13 and the second voice coil 23 are increased, and an amplitude of the first diaphragm assembly 12 and an amplitude of the second diaphragm assembly 22 are increased. In other embodiments, the third magnet 30 may also be located between the first speaker 10 and the second speaker 20, but is not connected to either the first speaker 10 or the second speaker 20. The third magnet 30 is positioned by another structure. This is not limited herein.

Figure 13:
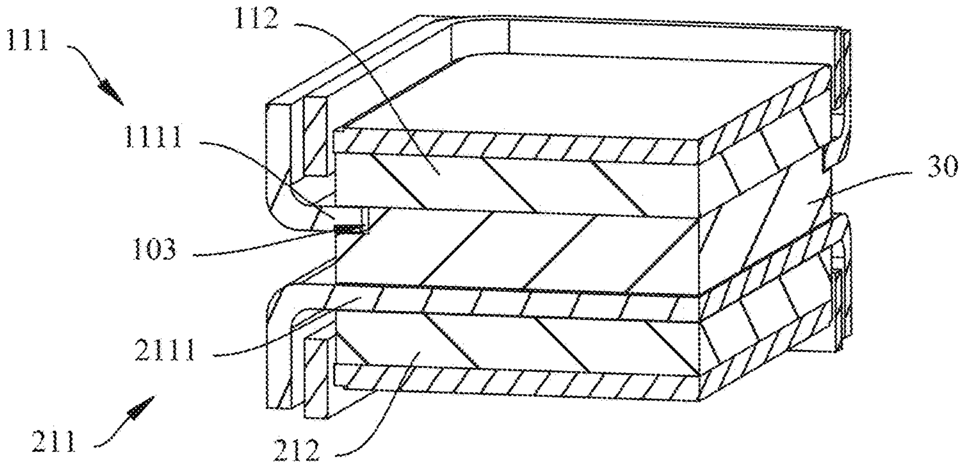
Figure 14:
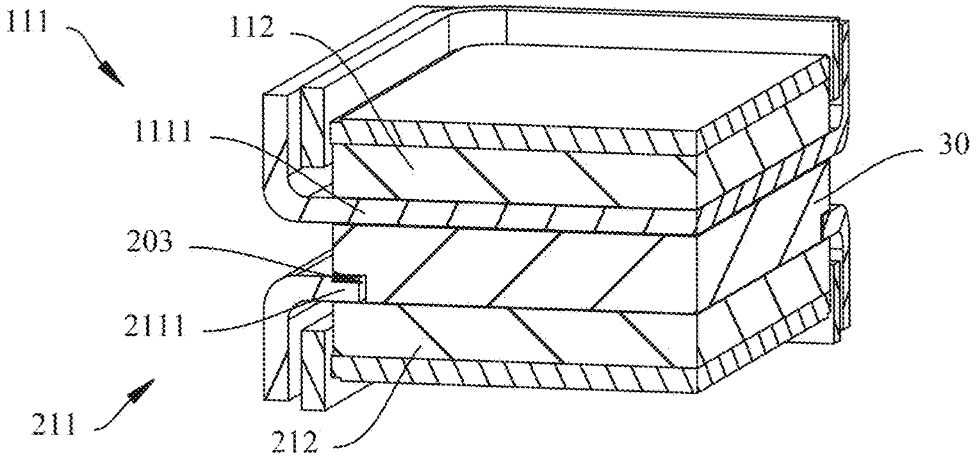

Optionally, both the first support portion 1111 and the second support portion 2111 are closed plate-like structures. In other words, no through-holes are provided on the first support portion 1111 and the second support portion 2111. The third magnet 30 may be mounted on the first support portion 1111 and spaced apart from the second support portion 2111, or mounted on the second support portion 2111 and spaced apart from the first support portion 1111. In this case, the first speaker 10 and the second speaker 20 may still be flexibly mounted, which reduces the difficulty of assembling. Refer to FIG. 13 and FIG. 14, the third magnet 30 may also be connected to both the first support portion 1111 and the second support portion 2111. In this case, the magnetic line between the first magnet 112 and the third magnet 30 is constrained through the first support portion 1111, and the magnetic line between the second magnet 212 and the third magnet 30 is constrained through the second support portion 2111, to reduce magnetic leakage. The third magnet 30 may be fastened to the first support portion 1111 or/and the second support portion 2111 by adhering or soldering, or may be only held between the first support portion 1111 and the second support portion 2111. The third magnet 30 is not fastened to either the first support portion 1111 or the second support portion 2111. This is not limited herein. A cross-sectional area of the third magnet 30 may be the same as cross-sectional areas of the first magnet 112 and the second magnet 212, to enable the magnetic lines between the first magnet 112 and the second magnet 212 to be uniformly distributed, and reduce influence on the directions of the magnetic lines in the first edge portion 1112 and the second edge portion 2112.

Refer to FIG. 13. Optionally, a first avoidance slot 103 is provided on a side, facing the second magnetically conductive yoke 211, of the first magnetically conductive yoke 111. Specifically, the first avoidance slot 103 is provided on a side, facing the second support portion 2111, of the first support portion 1111. The second support portion 2111 is a closed plate-like structure. The third magnet 30 is at least partially accommodated in the first avoidance slot 103, to reduce the distance between the first magnet 112 and the second magnet 212. Compared with an embodiment in which both the first support portion 1111 and the second support portion 2111 are closed plate-like structures, this disposing enhances superimposition effect of magnetic fields among the first magnet 112, the second magnet 212, and the third magnet 30, to increase magnetic field strength of the first magnetic gap 102 and the second magnetic gap 202. The first avoidance slot 103 may be a through-slot. The third magnet 30 abuts against the first magnet 112, to enable the magnetic line of the third magnet 30 to be directly connected to the magnetic line of the first magnet 112, and further reduce the distance between the first magnet 112 and the second magnet 212. In this case, the third magnet 30 may abut against or may be spaced apart from the second support portion 2111. The first magnetically conductive yoke 111 may abut against or may be spaced apart from the second magnetically conductive yoke 211. The third magnet 30 may be fastened to a bottom wall of the first avoidance slot 103 or the first magnet 112 by adhering or soldering. This is not limited herein.

Refer to FIG. 14. Optionally, a second avoidance slot 203 is provided on a side, facing the first magnetically conductive yoke 111, of the second magnetically conductive yoke 211. Specifically, the second avoidance slot 203 is provided on a side, facing the first support portion 1111, of the second support portion 2111. The first support portion 1111 is a closed plate-like structure. The third magnet 30 is at least partially accommodated in the second avoidance slot 203, to reduce the distance between the first magnet 112 and the second magnet 212. Compared with an embodiment in which both the first support portion 1111 and the second support portion 2111 are closed plate-like structures, this disposing enhances superimposition effect of magnetic fields among the first magnet 112, the second magnet 212, and the third magnet 30, to increase magnetic field strength of the first magnetic gap 102 and the second magnetic gap 202. The second avoidance slot 203 may be a through-slot, and the third magnet 30 abuts against the second magnet 212, to enable the magnetic line of the third magnet 30 to be directly connected to the magnetic line of the second magnet 212, and further reduce the distance between the first magnet 112 and the second magnet 212. In this case, the third magnet 30 may abut against or may be spaced apart from the first support portion 1111. The first magnetically conductive yoke 111 may abut against or may be spaced apart from the second magnetically conductive yoke 211. The third magnet 30 may be fastened to a bottom wall of the second avoidance slot 203 or the second magnet 212 by adhering or soldering. This is not limited herein.

Figure 15:
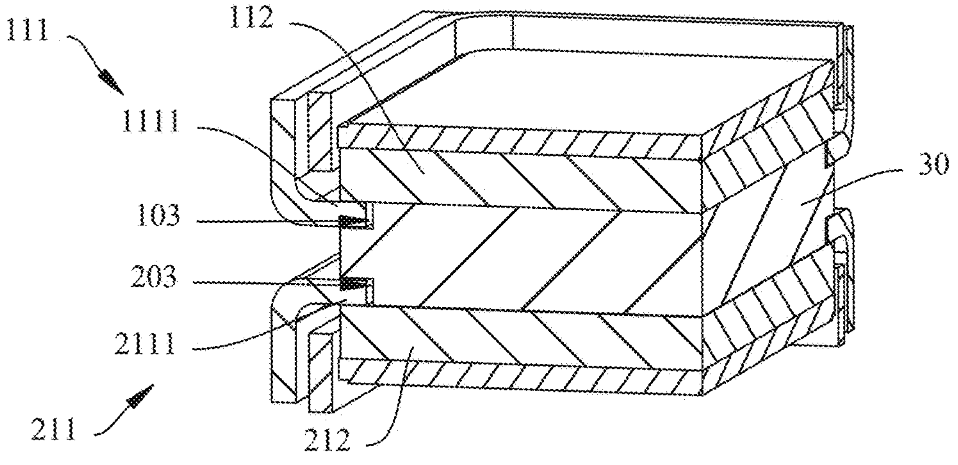

Refer to FIG. 15. Optionally, the first avoidance slot 103 is provided on the first support portion 1111, the second avoidance slot 203 is provided on the second support portion 2111, and the third magnet 30 is partially held in the first avoidance slot 103 and partially held in the second avoidance slot 203. Compared with disposing of providing only the first avoidance slot 103 or only the second avoidance slot 203, this disposing further reduces the distance between the first magnet 112 and the second magnet 212, and further enhances the magnetic flux density in the first magnetic gap 102 and the second magnetic gap 202. The first avoidance slot 103 and the second avoidance slot 203 may be through-slots, and the third magnet 30 abuts against both the first magnet 112 and the second magnet 212. In this way, the first magnet 112, the second magnet 212, and the third magnet 30 form a large magnet. This enhances the magnetic flux density in the first magnetic gap 102 and the second magnetic gap 202, and further reduces losses of the magnetic line. In this case, the first support portion 1111 and the second support portion 2111 may abut against or spaced apart from each other.

Finally, it should be noted that: the above, are only specific implementations of this application, but the scope of protection of this application is not limited thereto, and any changes or substitutions within the scope of the technology disclosed in this application shall be covered within the scope of protection of this application. Therefore, the protection scope of this application shall be subject to the protection scope of the claims.

The invention claimed is:

1. A speaker assembly, comprising:

a first speaker, comprising a first magnetic circuit assembly, a first voice coil, and a first diaphragm assembly, wherein the first magnetic circuit assembly comprises a first magnetically conductive yoke and a first magnet, the first diaphragm assembly and the first magnetically conductive yoke are enclosed to form first accommodation space, the first magnet and the first voice coil are located in the first accommodation space, and the first voice coil is disposed around the first magnet and connected to the first diaphragm assembly; and a second speaker, stacked with the first speaker in a reverse direction, wherein the second speaker comprises a second magnetic circuit assembly, a second voice coil, and a second diaphragm assembly, the second magnetic circuit assembly comprises a second magnetically conductive yoke and a second magnet, the second diaphragm assembly and the second magnetically conductive yoke are enclosed to form second accommodation space, the second magnet and the second voice coil are located in the second accommodation space, and the second voice coil is disposed around the second magnet and connected to the second diaphragm assembly;

wherein a direction of a magnetic pole of a magnetic circuit of the first magnet is consistent with a direction of a magnetic pole of a magnetic circuit of the second magnet;

wherein the first magnetic circuit assembly further comprises a first edge-magnetic structure, the first edge-magnetic structure is disposed in the first accommodation space and disposed around the first magnet, a direction of a magnetic pole of a magnetic circuit of the first edge-magnetic structure is opposite to the direction of the magnetic pole of the magnetic circuit of the first magnet, and a first magnetic gap is formed between the first edge-magnetic structure and the first magnet; and wherein the second magnetic circuit assembly further comprises a second edge-magnetic structure, the second edge-magnetic structure is disposed in the second accommodation space and disposed around the second magnet, a direction of a magnetic pole of a magnetic circuit of the second edge-magnetic structure is opposite to the direction of the magnetic pole of the magnetic circuit of the second magnet, and a second magnetic gap is formed between the second edge-magnetic structure and the second magnet.

2. The speaker assembly according to claim 1, wherein the first speaker further comprises a first center magnetic yoke, and the first center magnetic yoke and the first magnetically conductive yoke jointly hold the first magnet; and wherein the second speaker further comprises a second center magnetic yoke, and the second center magnetic yoke and the second magnetically conductive yoke jointly hold the second magnet.

3. The speaker assembly according to claim 2, wherein the first speaker further comprises a first support frame, the first support frame is connected between the first diaphragm assembly and the first magnetically conductive yoke; and wherein the second speaker further comprises a second support frame, and the second support frame is connected between the second diaphragm assembly and the second magnetically conductive yoke.

4. The speaker assembly according to claim 3, wherein the first magnetically conductive yoke, the first magnetic circuit assembly, the first voice coil, the first diaphragm assembly, the second magnetically conductive yoke, the second magnetic circuit assembly, the second voice coil, and the second diaphragm assembly are disposed in a same centerline.

5. The speaker assembly according to claim 1, wherein the first magnetically conductive yoke comprises a first support portion and a first edge portion that is connected to the first support portion, the first edge portion and the first support portion are disposed at a first included angle, the first edge portion is disposed around the first magnet, the first magnet is connected to the first support portion, a first magnetic gap is formed between the first magnet and the first edge portion, and the first voice coil at least partially extends into the first magnetic gap; and wherein the second magnetically conductive yoke comprises a second support portion and a second edge portion that is connected to the second support portion, the second edge portion and the second support portion are disposed at a second included angle, the second edge portion is disposed around the second magnet, the second magnet is connected to the second support portion, a second magnetic gap is formed between the second magnet and the second edge portion, and the second voice coil at least partially extends into the second magnetic gap.

6. The speaker assembly according to claim 5, wherein a width of the first magnetic gap is the same as a width of the second magnetic gap.

7. The speaker assembly according to claim 5, wherein the first magnet has four first side surfaces, the four first side surfaces are disposed around the first magnet, the first edge portion comprises four first sub-portions, the four first sub-portions are disposed around the first magnet and are spaced apart from each other, each first sub-portion is in parallel to one of the first side surfaces, and a first magnetic gap is formed between the first sub-portion and the corresponding first side surface; and wherein the second magnet has four first side surfaces, the four first side surfaces are disposed around the second magnet, the second edge portion comprises four second sub-portions, the four second sub-portions are disposed around the second magnet and are spaced apart from each other, each second sub-portion is in parallel to two of the first side surfaces, and a second magnetic gap is formed between the second sub-portion and the corresponding first side surface.

8. The speaker assembly according to claim 1, wherein the first edge-magnetic structure comprises a plurality of first edge magnets, and each first edge magnet of the plurality of first edge magnets is disposed in the first accommodation space and circumferentially disposed around the first magnet; and wherein the second edge-magnetic structure comprises a plurality of second edge magnets, and each second edge magnet of the plurality of second edge magnets is disposed in the second accommodation space and circumferentially disposed around the second magnet.

9. The speaker assembly according to claim 1, wherein the first speaker is spaced apart from the second speaker.

10. The speaker assembly according to claim 1, wherein the first speaker abuts against the second speaker.

11. A speaker assembly, comprising:

a first speaker, comprising a first magnetic circuit assembly, a first voice coil, and a first diaphragm assembly, wherein the first magnetic circuit assembly comprises a first magnetically conductive yoke and a first magnet, the first diaphragm assembly and the first magnetically conductive yoke are enclosed to form first accommodation space, the first magnet and the first voice coil are located in the first accommodation space, and the first voice coil is disposed around the first magnet and connected to the first diaphragm assembly;

a second speaker, stacked with the first speaker in a reverse direction, wherein the second speaker comprises a second magnetic circuit assembly, a second voice coil, and a second diaphragm assembly, the second magnetic circuit assembly comprises a second magnetically conductive yoke and a second magnet, the second diaphragm assembly and the second magnetically conductive yoke are enclosed to form second accommodation space, the second magnet and the second voice coil are located in the second accommodation space, and the second voice coil is disposed around the second magnet and connected to the second diaphragm assembly; and a third magnet that is disposed between the first speaker and the second speaker;

wherein a direction of a magnetic pole of a magnetic circuit of the first magnet is consistent with a direction of a magnetic pole of a magnetic circuit of the second magnet; and wherein a direction of a magnetic pole of a magnetic circuit of the third magnet is consistent with the direction of the magnetic pole of the magnetic circuit of the first magnet and the direction of the magnetic pole of the magnetic circuit of the second magnet.

12. The speaker assembly according to claim 11, wherein the third magnet is connected to at least one of the first speaker and the second speaker.

13. The speaker assembly according to claim 11, wherein a first avoidance slot is provided on a side, facing the second magnetically conductive yoke, of the first magnetically conductive yoke, and the third magnet is at least partially accommodated in the first avoidance slot.

14. The speaker assembly according to claim 13, wherein the first avoidance slot is a through-slot, and the third magnet is connected to the first magnet.

15. The speaker assembly according to claim 11, wherein a second avoidance slot is provided on a side, facing the first magnetically conductive yoke, of the second magnetically conductive yoke, and the third magnet is at least partially accommodated in the second avoidance slot.

16. The speaker assembly according to claim 15, wherein the second avoidance slot is a through-slot, and the third magnet is connected to the second magnet.

17. An electronic device, comprising:

a speaker assembly, wherein the speaker assembly comprises:

a first speaker, comprising a first magnetic circuit assembly, a first voice coil, and a first diaphragm assembly, wherein the first magnetic circuit assembly comprises a first magnetically conductive yoke and a first magnet, the first diaphragm assembly and the first magnetically conductive yoke are enclosed to form first accommodation space, the first magnet and the first voice coil are located in the first accommodation space, and the first voice coil is disposed around the first magnet and connected to the first diaphragm assembly; and a second speaker, stacked with the first speaker in a reverse direction, wherein the second speaker comprises a second magnetic circuit assembly, a second voice coil, and a second diaphragm assembly, the second magnetic circuit assembly comprises a second magnetically conductive yoke and a second magnet, the second diaphragm assembly and the second magnetically conductive yoke are enclosed to form second accommodation space, the second magnet and the second voice coil are located in the second accommodation space, and the second voice coil is disposed around the second magnet and connected to the second diaphragm assembly;

wherein a direction of a magnetic pole of a magnetic circuit of the first magnet is consistent with a direction of a magnetic pole of a magnetic circuit of the second magnet;

wherein the first magnetic circuit assembly further comprises a first edge-magnetic structure, the first edge-magnetic structure is disposed in the first accommodation space and disposed around the first magnet, a direction of a magnetic pole of a magnetic circuit of the first edge-magnetic structure is opposite to the direction of the magnetic pole of the magnetic circuit of the first magnet, and a first magnetic gap is formed between the first edge-magnetic structure and the first magnet; and wherein the second magnetic circuit assembly further comprises a second edge-magnetic structure, the second edge-magnetic structure is disposed in the second accommodation space and disposed around the second magnet, a direction of a magnetic pole of a magnetic circuit of the second edge-magnetic structure is opposite to the direction of the magnetic pole of the magnetic circuit of the second magnet, and a second magnetic gap is formed between the second edge-magnetic structure and the second magnet.

18. The speaker assembly according to claim 4, wherein the first magnetically conductive yoke comprises a first support portion and a first edge portion that is connected to the first support portion, the first edge portion and the first support portion are disposed at a first included angle, the first edge portion is disposed around the first magnet, the first magnet is connected to the first support portion, a first magnetic gap is formed between the first magnet and the first edge portion, and the first voice coil at least partially extends into the first magnetic gap; and wherein the second magnetically conductive yoke comprises a second support portion and a second edge portion that is connected to the second support portion, the second edge portion and the second support portion are disposed at a second included angle, the second edge portion is disposed around the second magnet, the second magnet is connected to the second support portion, a second magnetic gap is formed between the second magnet and the second edge portion, and the second voice coil at least partially extends into the second magnetic gap.

19. The electronic device according to claim 17, wherein the first edge-magnetic structure comprises a plurality of first edge magnets, and each first edge magnet of the plurality of first edge magnets is disposed in the first accommodation space and circumferentially disposed around the first magnet; and wherein the second edge-magnetic structure comprises a plurality of second edge magnets, and each second edge magnet of the plurality of second edge magnets is disposed in the second accommodation space and circumferentially disposed around the second magnet.

20. The electronic device according to claim 17, wherein the first magnetically conductive yoke comprises a first support portion and a first edge portion that is connected to the first support portion, the first edge portion and the first support portion are disposed at a first included angle, the first edge portion is disposed around the first magnet, the first magnet is connected to the first support portion, a first magnetic gap is formed between the first magnet and the first edge portion, and the first voice coil at least partially extends into the first magnetic gap; and wherein the second magnetically conductive yoke comprises a second support portion and a second edge portion that is connected to the second support portion, the second edge portion and the second support portion are disposed at a second included angle, the second edge portion is disposed around the second magnet, the second magnet is connected to the second support portion, a second magnetic gap is formed between the second magnet and the second edge portion, and the second voice coil at least partially extends into the second magnetic gap.

* * * * *